United States Patent
Poklemba et al.

(10) Patent No.: US 6,606,010 B1
(45) Date of Patent: Aug. 12, 2003

(54) QUADRATURE VESTIGIAL SIDEBAND DIGITAL COMMUNICATIONS METHOD

(75) Inventors: John J. Poklemba, Ijamsville, MD (US); Gregory S. Mitchell, Bethesda, MD (US)

(73) Assignee: The Aerospace Corporation, El Segundo, CA (US)

( * ) Notice: Subject to any disclaimer, the term of this patent is extended or adjusted under 35 U.S.C. 154(b) by 46 days.

(21) Appl. No.: 10/060,728

(22) Filed: Jan. 30, 2002

(51) Int. Cl.[7] .................................................. H03C 3/00
(52) U.S. Cl. ........................ 332/103; 332/170; 329/357; 375/270
(58) Field of Search ................................ 332/103, 159, 332/170, 171; 329/308, 357, 349, 353, 358, 360; 375/270, 301, 321

(56) References Cited

U.S. PATENT DOCUMENTS 5,521,559 A * 5/1996 Ichihara ..................... 332/117
5,706,311 A * 1/1998 Koyama ..................... 375/298
5,881,107 A * 3/1999 Termerinac et al. ........ 375/279

* cited by examiner

Primary Examiner—Henry Choe
(74) Attorney, Agent, or Firm—Derrick Michael Reid

(57) ABSTRACT

A quadrature vestigial sideband (QVSB) communication system provide bandwidth efficient data transmission using cross coupled data signaling during both transmit and receive having controlled intersymbol interference. The QVSB modem includes cross coupled arm transmit and receive data filtering on both of the I&Q channels providing a bandwidth efficient QVSB spectra. A quadrature crosstalk maximum likelihood sequence estimator implements a Viterbi decoding algorithm for providing estimated data sequence outputs. The receiver is a coherently aided demodulator synchronized by a synchronization loop providing time and phase references using the estimated data sequence outputs.

20 Claims, 6 Drawing Sheets

QVSB MODULATOR DEMODULATOR SYSTEM

QVSB MODULATOR DEMODULATOR SYSTEM

FIG. 1

FIG. 2A   25% RAISED-COSINE QVSB EYE DIAGRAM

FIG. 2B   OCTAL-JUMP QVSB EYE DIAGRAM

DOUBLE-JUMP SPECTRA

QUADRUPLE-JUMP SPECTRA

OCTAL-JUMP SPECTRA

SMOOTHED DOUBLE-JUMP SPECTRA

QVSB DATA SEQUENCE RECOVERY BLOCK DIAGRAM

DIGITAL DATA FEEDBACK SEQUENCE DIAGRAM

FIG. 7A

DIGITAL DERIVATIVE DATA FEEDBACK SEQUENCE DIAGRAM

FIG. 7B

DIGITAL HILBERT DATA FEEDBACK SEQUENCE DIAGRAM

FIG. 7C

QUADRATURE VESTIGIAL SIDEBAND DIGITAL COMMUNICATIONS METHOD

FIELD OF THE INVENTION

The invention relates to the field of quadrature modulation communication systems. More particularly, the present invention relates to vestigial sideband modulation communications systems using cross coupled independent data stream modulated on a common carrier in quadrature.

BACKGROUND OF THE INVENTION

The rapid, worldwide expansion of communications services underscores the importance of bandwidth conservation. With increased demands for cellular and personal communications services within a finite radio frequency spectrum, there is an ever-increasing contention for bandwidth. Cellular services are growing at a geometric rate. Microcellular sites are being advocated to handle the increased demand through localized frequency reuse, and hundreds of low earth orbit and medium earth orbit satellites will support the increasing demand for bandwidth over the next decade. In digital video communications, high definition television (HDTV) transmits at 21.5 Mbits/s with a greatly improved picture quality that must be compatible with the existing 6.0 MHz channel bandwidth allocation. This requires a bandwidth efficiency of greater than 3.0 bits/s/Hz. Additionally, data throughputs in communications have also been increasing at an exponential rate. Existing bandwidth allocations are typically shared among different services. A review of the current frequency allocations reveals that the majority of bands exhibit sharing of multiple services, such as, fixed and mobile satellite services and earth exploration satellites. A natural consequence of this sharing is increasing interference. With the bandwidth being a finite resource, there are increasing demands for this finite bandwidth resources creating a need to develop general purpose practical bandwidth efficiency communication techniques.

Digital data has been transmitted using double sideband (DSB) or quadrature double sideband (QDSB) techniques. Occasionally, single sideband (SSB) formats have been used, and more recently two vestigial sideband (VSB) formats have been selected as the standards for off the air and cable HDTV. DSB signaling is the simplest and most straight forward means to transmit analog or digital information on a carrier, such as, when using AM and FM methods. SSB is employed when the bandwidth is at a premium, such as, when multiplexing terrestrial telephone channels. VSB is used when requiring a controlled component of energy at the carrier frequency, such as, in TV and HDTV communications.

One of the most useful ways to assess bandwidth efficiency is to make use of the Shannon channel capacity bound that provides an upper limit on the signaling rate $R_s$ for error free transmission over an arbitrary channel. Modern digital modulation techniques are compared to the Shannon channel capacity bound to provide a performance overview. When the maximum signaling rate is normalized by the required transmission bandwidth, a measure of the bandwidth efficiency of the modulation method is obtained in units of bits/s/Hz. This normalized performance benchmark is known for many of the widely used modulation formats. Unfiltered digital data typically has a $\sin(x)/(x)$ frequency response with significant sidelobe content over a bandwidth wider than the data symbol rate. The Nyquist technique is used to transmit digital data within a limited bandwidth without intersymbol interference. Intersymbol interference (ISI) is eliminated when the response magnitude through a transmission channel has vestigial symmetry about the half amplitude point that occurs at a frequency equal to half the symbol rate with the communication channel providing a linear phase response. When the magnitude response of the channel transmission function has vestigial symmetry about the half amplitude point that occurs at a frequency equal to half the symbol rate, and when the transmission function has linear phase, data can be communicated without ISI. The bandwidth efficiency has been calculated assuming transmission at the minimum Nyquist bandwidth $R_s/2$. A $E_b/N_o$ scale is used to derive a bit error ratio (BER), for example, $10^{-6}$, during data communications.

The single sideband and quadrature single sideband (QSSB) modulation format data points have exactly twice the bandwidth efficiency of the corresponding double sideband counterparts where the effect of quadrature channel crosstalk can be rendered negligible. The quadrature channel crosstalk is inherent in QSSB transmission in which independent data is placed on quadrature carriers. The crosstalk degrades performance and has been a major problem in QSSB communications. The DSB techniques diverge from the bound as the number of bits/s/Hz or bandwidth efficiency is increased, whereas ideally transmitted QSSB formats run parallel to the bound. This divergence is due to the redundancy in transmitting two sideband replicas. As the bandwidth efficiency of the channel is increased, QSSB potentially offers a progressively larger advantage over DSB transmission. In particular, when a six bit/s/Hz efficiency is needed, a conventional phase shift keying (PSK) may be used, such as 64-PSK. The DSB scheme would be required as compared to an 8-PSK QSSB format. The DSB scheme requires 18 dB more signal power to achieve the same BER. In general, the number of signal levels needed with DSB techniques is the square of that required with an equivalent QSSB format. These large discrepancies in signal to noise ratio (SNR) and number of signal levels leave considerable margin for non-ideal SSB signaling due to crosstalk. SSB uses half the bandwidth of conventional DSB yielding twice the bandwidth efficiency. Because of the sharp cutoff characteristics at one of the SSB band edges, vestigial sideband method is often used to realize a more gradual rolloff. The VSB method is not as bandwidth efficient as the SSB method, but generally leads to a more practical solution with controlled crosstalk. Conventional VSB filtering uses inphase and quadrature arm filters in both the transmit modulators and receive demodulators. The data stream is reinforced in the receiver by transmitting the data stream through both quadrature and inphase channels. The quadrature arm odd responses combine to yield a even response. The VSB is slightly less bandwidth efficient than SSB, but is more controlled and easier to implement. VSB or SSB frequency spectra transform to inphase and quadrature impulse response with even and odd time symmetry, respectively.

In practice, during VSB modem transmit and receive filtering modeling, matched filtering is employed so that the square root of the Nyquist frequency response is apportioned equally to the transmitter and receiver as opposed to a full response. In general, impulse responses with equally spaced axis crossings will only occur after passing through matched sets of transmit and receive filters. The critical filtering for a Nyquist band limited VSB transmitters and receivers is employed in HDTV. In the HDTV system, a single data channel is communicated through both inphase and quadrature (I&Q) channels respectively having a $h_i$ arm filter and a $h_q$ arm filter in both of the transmitter and receiver for communicating $i(t)$ and $i_H(t)$ signals. The transmit square root $h_i$ and $h_q$ arm filters have an even and odd impulse response relationship but neither has equally spaced axis crossings. The H subscript is used to denote the odd impulse responses that are similar to the Hilbert transform of the even impulse responses. The Hilbert transform $j*\text{sgn}(f)$ has an abrupt 90° phase transition in the frequency domain. The Hilbert transform is used to realize the precipitous sideband rejection in SSB via the phase shift generation method. The sideband rejection in VSB is more gradual. Sideband rejection is typically realized through a combination of I&Q channel amplitude mismatch in conjunction with a Hilbert phase shift discontinuity and hence similar to the Hilbert transform.

In the receiver, both the I&Q filter output responses are approximately the same with each having even time symmetry. The I-channel response is related to the Q-channel response. The Q-channel response is approximately the same at the I-Channel response because it is roughly the cascade of two Hilbert transform 90° phase shifted versions of the I-channel response that which is merely an inverted version of the I-channel response. The Q-channel output then is summed with the I-channel to improve the detection SNR by 3.0 dB. There is no ISI problem when Nyquist filtering is used in conjunction with VSB data transmission as is evidenced by I-channel responses in a 25% raised cosine VSB eye diagram.

Vestigial sideband is defined such that when its spectrum is downconverted to baseband, the inner transition regions of its positive and negative frequency image bands overlap and are complementary so as to sum to unity with proper phasing. VSB is a good compromise between DSB and SSB because VSB approaches SSB in bandwidth efficiency, but does not require an infinitely sharp transition band. HDTV will be transmitted digitally using trellis coded 8-ary VSB and 16-ary VSB formats, for terrestrial and cable distribution, respectively. These VSB formats require 8-ary and 16-ary amplitude levels in their baseband modulating waveforms. To facilitate VSB signaling, a common digital data stream modulates two quadrature carriers where the impulse response pairs are orthogonal and correlated. Quadrature SSB (QSSB) and QVSB are more complex than SSB and VSB because each of the inphase (I) and quadrature (Q) baseband modulating channels contain the superposition of an independent pair of data streams having interference and crosstalk that must be controlled. The advantage of QSSB/QVSB over SSB/VSB is a doubling of the information carrying capacity. The disadvantages are greater implementation complexity, and a typically reduced noise margin due to crosstalk.

There are fundamentally two methods of generating SSB/VSB, that is, the quadrature phase shift method and sideband filtering method. In this study, the phase shift method is favored over the filtering approach, because precise control over the modulating waveshapes will be necessary; and this precision is best achieved with digital signal processing techniques. The phase shift approach is shown analytically for an SSB modulator output, $s(t)$ by an SSB modulator output equation $s(t)=i(t)\cos(\omega_c t)\pm\tilde{i}(t)\sin(\omega_c t)$, where the baseband message waveform, $i(t)$ and the Hilbert transform $\tilde{i}(t)$ modulate quadrature carriers. The minus sign on the Hilbert component yields upper sideband (USB), whereas a plus sign gives lower sideband (LSB). VSB can also be represented in this manner, but the inphase and quadrature components are not strictly Hilbert transforms.

To conserve bandwidth using SSB/VSB modem baseband filtering modeling, digital modulation techniques are filtered prior to transmission. To maximize the detection SNR, the receive filtering is matched to the transmit filter. The critical baseband filtering for a band limited SSB/VSB modem uses a single data stream with single arm filtering for VSB modulation. The modulated output signal is generated according to modulator output equation. To facilitate SSB transmission, the inphase filters with the i subscripts and the quadrature filters with the q subscripts must be a Hilbert transform pair $h_q$ and $H_q$, such that, $h_q(t)=(1/\pi t)*h_i(t)$ and $H_q(f)=j\text{sgn}(f)H_i(f)$. The symbol * is the convolution operator, and (t) is the time domain variable and (f) is the frequency domain variable. The Hilbert transform pair $h_i$ and $h_q$ are orthogonal by definition, and with a perfectly balanced structure, complete cancellation of one of the sidebands results. When $h_i(t)$ has even symmetry, $h_q(t)$ would have odd. From the frequency response definition in $H(f)$, the cascaded response of any two quadrature filters is the negative of the inphase filter responses, for example $h_q*h_q=-h_i$. Because the noises in the I/Q detection arms are uncorrelated, and the signal components are perfectly negatively correlated, combining the I&Q filtered outputs yields a 3.0 dB improvement in the detection SNR. The term $\tilde{h}(t)$ is the Hilbert transform $h(t)$. The double tilde term $\tilde{\tilde{h}}(t)$ is the Hilbert transform of $\tilde{h}(t)$. Subtracting the double tilde impulse response $\tilde{\tilde{h}}_i$ from the inphase counterpart acts as constructive interference where $h_q(t)=\tilde{h}_i(t)$ and $h_i(t)=\tilde{h}_q(t)$ and $\tilde{\tilde{h}}_i(t)=-h_i(t)$. For VSB transmission, the $h_i$ and $h_q$ filter pairs are not strictly Hilbert transforms of one another, but have vestigial symmetry about the half power points in the frequency domain. This type of VSB modem is used in HDTV, where $i(t)$ has eight or sixteen detection levels.

For memoryless Nyquist filtering, the Nyquist family of filters are evaluated for applicability in achieving bandwidth efficient transmission with minimal degradation in SNR performance due to ISI. Ideal rectangular and raised cosine filtering have been used for Nyquist filtering. Nyquist impulse responses are sinc based waveshapes with even time symmetry and equally spaced zero or axis crossings at integer multiples of the data symbol time. As a result, responses from adjacent data symbols do not interfere at the detection sampling instants. The impulse responses with equally spaced axis crossings are realized when the frequency response has vestigial symmetry about the half amplitude transmission points. The most concentrated distribution of signal bandwidth in the frequency domain is the ideal rectangular spectrum using ideal rectangular filtering. The magnitude for an SSB version of the ideal rectangular spectrum for the minimum Nyquist bandwidth $R_s/2$ can be considered on a frequency axis normalized by the data symbol rate. The analytic signal is used so that SSB frequency response is at baseband. The ideal rectangular spectrum represents the sharpest cutoff extreme of the Nyquist filtering including the raised cosine filtering. The inphase impulse response corresponding to the SSB rectangular spectrum is the sinc function, and the quadrature impulse response is a raised cosine with both decaying at $1/t$. Because the two impulses responses are Hilbert transform pairs, the quadrature term $h_q(t)$ will have odd symmetry because the quadrature term is odd and equivalent to $1/\pi t$ convolved with the even sinc function. The inphase and quadrature transform pair is given by $h_i(t)=\sin(\pi R_s t)/\pi R_s t$ and $h_q=(1-\cos(\pi R_s t))/\pi R_s t$.

When the SSB spectrum is band limited to half the data symbol rate, the corresponding inphase impulse response will have equally spaced axis crossings at integer multiples of the symbol time $T_s$ and the quadrature impulse response will be zero at ±even multiples of the data symbol time. The quadrature impulse response has a 1/πt symmetry. In a QSSB scheme, the quadrature impulse response component from one channel will overlay the inphase component of the other channel. Hence, in the case of an ideal rectangular SSB quadrature impulse response pair, the quadrature component will contribute ISI at ±odd multiples of the data symbol time. Although the envelope of the ISI only falls off as 1/t the ISI dispersion does not diverge because for random data sequences with half of the ISI positive and half negative resulting in significant cancellation. When the bandwidth of the rectangular SSB spectrum is doubled to $R_s$, the resulting quadrature impulse response pairs are zero at all adjacent symbol integer multiples where there will be no ISI at the detection sampling points. However, to achieve this perfect isolation, the same bandwidth as DSB is required.

A widely used Nyquist filter realization is the raised cosine, which has a sinusoidally shaped transition band. The frequency response for a raised cosine filter is defined by H(f). The raised cosine H(f) equation is a frequency response equation that defines the VSB magnitude response. The corresponding impulse response is defined as h(t). The rolloff factor is 0<r<1 and the half amplitude frequency is $f_h=R_s/2$. A closed form expression for the time domain Hilbert transform of the impulse response has not yet been found. The H(f) frequency response and h(t) time domain impulse response equations are used to model the raised cosine filter.

$$H(f) = \begin{cases} 1, & f \leq (1-r)f_h \equiv f_1 \\ \sqrt{\frac{1}{2}\left\{1 - \sin\left[\frac{\pi(f/f_h - 1)}{2r}\right]\right\}}, & f_1 \leq f \leq f_h \\ 0, & f \geq (1+r)f_h \equiv f_0 \end{cases}$$

$$h(t) = \frac{\sin(\pi R_s t) \cdot \cos(\pi R_s t)}{(\pi R_s t) \cdot [1 - (2rR_s t)^2]}$$

A Nyquist frequency response is known for a 20% raised cosine filter in a VSB channel. In practice, this filter can be closely approximated, but not realized exactly because of the perfectly flat passband and stopband. In addition, the stopband also has infinite attenuation. The corresponding impulse response pair for the 20% square root raised cosine VSB response can be generated by means of an FFT, and the impulse responses are very similar to the ideal rectangular filter pair except ideal rectangular filter pair have more ringing due to an abrupt transition band. The even response has equally spaced axis crossings, and the odd response has zeros at ±odd multiples of the data symbol interval.

Employing conventional raised cosine family filtering for QSSB or QVSB transmission would result in crosstalk that reduces the intersignal distances thereby degrading the BER performance. Partial response signaling has been used for SSB transmission. However, partial response signaling has not been extended to QSSB. The well known class-4 (1-$D^2$) system has no DC content and is characterized by a half sine wave magnitude response of a total bandwidth $R_s/2$. The (1-$D^2$) moniker implies that for each data symbol input, the PR filter outputs the difference of a data modulated sinc pulse with a two symbol delayed version. For this case, the Hilbert response does not have equally spaced axis crossings at ±even multiples of the data symbol time. In analyzing the band limiting pulse shapes for Nyquist equally spaced axis crossings, the cross correlation of the I/Q filter pairs should be zero at the detection sampling instants. In a typical modem, matched filters that are the square root of the Nyquist frequency transmittance function, are placed in the modulator and demodulator. The transmit output that only passes through the square root impulse response will generally not have equally spaced axis crossings resulting in ISI.

A restricted type of QVSB signaling has previously been disclosed in 1985. The QVSB system had two I&Q inphase and quadrature data channels modulated in quadrature by a carrier in the receiver and demodulated in quadrature in the receiver. There were no arm filters in the I&Q channels in the transmitter or receiver. At the output of the QVSB transmitter and at the input of the receiver were disposed bandpass raise cosine filters for VSB communication. The QVSB system operated only for very soft rolloff spectra of restricted bandwidth efficiency range with substantial degradations in signal to noise ratio (SNR) due to crosstalk. The QVSB data transmission used Nyquist filters from the raised cosine filtering to band limit the signal. Nyquist filtering is widely used to eliminate intersymbol interference in conventional digital data transmission schemes. However, in the QVSB system, Nyquist filtering exhibits quadrature crosstalk and ISI in both channels. The QVSB system has crosstalk between the inphase and quadrature (I&Q) channels in a controlled form similar to intersymbol interference in partial response systems. The QVSB system could use a maximum likelihood sequence estimator (MLSE) to remove the ISI based on a.Viterbi algorithm. The QVSB system could employ digital data feedback in the synchronization loops. These techniques are taught in U.S. Pat. No. 4,419,759, entitled Concurrent Carrier and Clock Synchronization for Data Transmission Systems, and U.S. Pat. No. 4,472,817, entitled Non-PLL Concurrent Carrier and Clock Synchronization. The QVSB system can behave like partial response systems where preceding could be used to avoid error propagation. However, the QVSB system precoder did not exploit the correlation information in the received samples. Consequently, the Viterbi probabilistic MLSE decoder showed a marked improvement over precoding. The QVSB system achieved a bandwidth efficiency of 2.3 bits/s/Hz for a 75% raised cosine rolloff passband. This is double-the rate of 1.14 bits/s/Hz for QPSK transmission with a corresponding rolloff passband. A digital SNR $E_b/N_o$ penalty of approximately 2.1 dB at a bit error ratio (BER) of $10^{-5}$ was experienced as a result of the crosstalk. At a bandwidth efficiency of 3.0 Bits/s/Hz, the BER performance degraded by about an additional 5.0 dB due to the increased crosstalk.

Nyquist filtering during VSB data transmission for QVSB signaling can be analyzed using an eye diagram. An eye diagram is an overlay of the time response for all possible data sequences. The eye diagram highlights the effects of ISI. For the case of binary data, the Nyquist filtered waveforms that make up the eye diagram are typically bipolar. Hence, a threshold is set at zero and samples are taken in the center, at the maximum eye opening. Sample values above zero are detected as positive ones and samples below zero are detected as negative ones, that is, digital ones and zeros. Nyquist filtering does eliminate ISI at integer symbol time multiples. Hence, it is known that digital data may be transmitted without ISI when the channel filter response satisfies the Nyquist criterion. The best linear channel detection performance is obtained by matching the transmit and receive filter responses. The best known Nyquist filters are the raised cosine filters. For example, a VSB full raised cosine frequency response with a 25% rolloff rate would have corresponding inphase and quadrature impulse responses. These impulse responses correspond to the overall Nyquist channel response when a single data one is transmitted. Opposite polarity impulse responses would be used when a data zero is transmitted. To facilitate VSB, complementary impulse responses with even and odd time symmetry are needed in the quadrature channels. The impulse response horizontal axis marks are spaced such that adjacent symbol responses are centered at integer symbol time multiples. The tails from adjacent symbol impulse responses will overlap. However, for the inphase impulse response, there is no ISI at integer symbol time multiples. Therefore, data sequences can be symbol by symbol detected without any degradation in SNR performance. The quadrature impulse response has ISI only at odd symbol time multiples. The restricted QVSB system achieved a good BER performance using a 100% raised cosine filter. The performance for the 75% and 50% cases was substantially degraded, and solutions do not converge below 50% rolloff. These and other disadvantages are solved or reduced using the invention.

SUMMARY OF THE INVENTION

An object of the invention is to provide bandwidth efficient communications using quadrature vestigial sideband signaling.

Another object of the invention is to generate bandwidth efficient I&Q channel waveshapes that exhibit minimal intersymbol interference and crosstalk.

Yet another object of the invention is to generate bandwidth efficient I&Q channel waveshapes that exhibit minimal intersymbol interference and crosstalk with reduced bit error rates.

The present invention is a method for transmitting digital data in a bandwidth efficient manner using a quadrature vestigial sideband (QVSB) signaling. The method can be used in data communication systems. The QVSB method may double the capacity of comparable conventional formats by placing overlapping independent data on each of two carriers in phase quadrature using cross coupled arm filters. The data overlap is necessary to achieve QVSB spectral occupancy.

The method eliminates as much of the crosstalk as desired in progressive steps. The method is realized by modulating transmit and demodulating receive hardware architectures, the later of which preferably including a quadrature crosstalk maximum likelihood sequence estimator (QCMLSE) specifically designed to support QVSB signaling within I and Q channel crosstalk. Using various combinations of filtering and higher level signaling constellations, the method can provide as high a bandwidth efficiency within signal processing technology permits with relatively little degradation in the signal to noise ratio (SNR).

A normalized channel capacity versus SNR for the QVSB implementation can be derived from models of the QVSB structure within a linear additive white Gaussian noise channel at perfect synchronization. Over a very broad range of raised cosine filter rolloffs, 4-ary QVSB achieves the same capacity as conventional 16-ary quadrature double sideband (QDSB), with up to 2.0 dB less required SNR at a BER=$10^{-5}$, and up to 5.5 dB less required SNR for 16-ary QVSB. The implementation works down to 0% rolloff that is equivalent to the ideal rectangular brick-wall filter response. In addition to the raised-cosine family, jump filters can be used to yield better capacity performance improvements. The performance is better at higher BERs, such as $10^{-4}$ and $10^{-3}$. The method can be augmented by forward error correction coding.

Operation with a 4-ary rectangular constellation over the complete range of Nyquist spectral rolloff characteristics has been achieved up to and including the 25% raised cosine response with graceful SNR degradation. Thus, the method is robust with greater bandwidth efficiency that can be realized via sharper rolloff. M-ary QVSB signaling achieves twice the capacity of M-ary QDSB signaling that is equivalent to the capacity of $M^2$-ary QDSB. In addition, M-ary QVSB attains the bandwidth efficiency with several dB less SNR than required for QDSB. Due to the percent rolloff definition for raised cosine filters, the same percent rolloff for QVSB and QDSB results in a transition band that is half as wide for QVSB and hence the factor of two in the bandwidth efficiency. QVSB spectral shaping enables all significant intersymbol interference (ISI) beyond the adjacent symbols of the crosstalk to be eliminated. Hence, the complexity of the QCMLSE decoder, that increases geometrically versus the number of additional ISI points, is reduced.

The method achieves more bandwidth efficient data transmission using QVSB signaling. Modulator and demodulator hardware structures implementing the method enable improved bandwidth efficient communications. These modem structures include SNR efficient synchronization loops that will substantially outperform brute force squaring circuitry. The method preferably relies upon transmit and receive data filtering, specialized QVSB spectra generation, the QCMLSE Viterbi decoding, and a coherently aiding demodulator synchronization loop.

The symbol integer spaced zeros in the quadrature impulse response as well as the inphase response are preferably realized by jump filtering. The ISI removal at 6 (±3) symbols can be realized through multiplication of the impulse responses by a time domain cosine waveform with a 6±3 symbol period. When the time domain cosine multiplication is performed on a sin(x)/(x) response, the corresponding ideal rectangular single jump spectra is shifted up and down resulting in the double jump spectrum. The ideal rectangular bandwidth is expanded by ⅙th. Similarly, the ISI at ±5, ±7 symbols can be eliminated by further multiplication and spectral shifting, resulting in the quadruple jump and octal jump spectra, respectively. A less complex alternative, that also results in greatly improved ISI, can be realized by smoothing the transitions of the double jump spectrum. The ISI at ±1 symbols can not be removed because a doubling of the bandwidth would result. Hence, whenever a data pulse is transmitted, the pulse will be subjected to and dominated by controlled ISI from the adjacent symbols in the opposing quadrature channel and this ISI will be of approximate relative magnitude ±0.5. The QCMSLE provides for effective Viterbi decoding that minimizes the effect of the controlled ISI for improved bandwidth efficient communications. These and other advantages will become more apparent from the following detailed description of the preferred embodiment.

DETAILED DESCRIPTION OF THE PREFERRED EMBODIMENT

Figure 1:
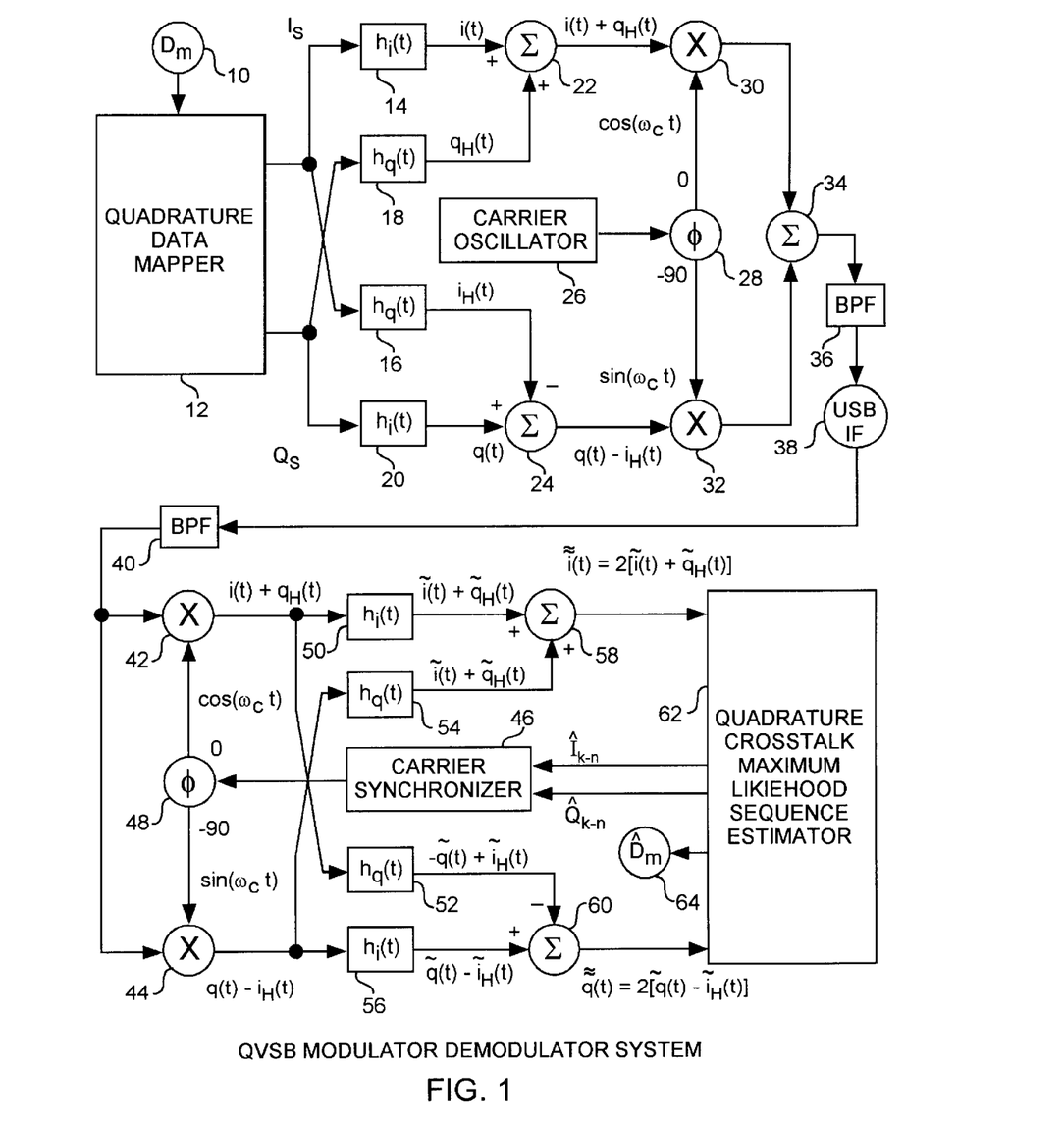
FIG. 1 is a schematic of a quadrature vestigial sideband (QVSB) modulator and demodulator system.

An embodiment of the invention is described with reference to the figures using reference designations as shown in the figures. Referring to FIG. 1, a quadrature vestigial sideband (QVSB) modulator receives $D_m$ input data 10 that is mapped by a quadrature data mapper 12 to generate independent inphase (I) symbols $I_s$ and quadrature (Q) symbols $Q_S$. A set of m possible data signals $D_m$ 10 is mapped into I&Q symbol values according to a constellation of modulation amplitude levels. In the general form, the symbols $I_s$ and $Q_S$ may be any two independent data sets. The mapper 12 receives the input data stream $D_m$ 10 and maps the data stream 10 into m-ary symbol steam according to an arbitrary m-ary modulation alphabet, for example, a 4-ary quadrature phase shift keying modulation alphabet. The symbol stream is then split by projection into the I and Q constellation axis for providing the $I_s$ and $Q_S$ symbol streams, at which point, the $I_s$ and $Q_S$ symbol streams are statistically independent symbol streams. Overlapping inphase and quadrature filter responses are used to facilitate QVSB signaling. To achieve overlapping filter responses, the I symbols $I_s$ and Q symbols $Q_S$ are respectively communicated to modulator cross coupled arm filters 14 and 16, and 18 and 20. The arm filters 14, 16, 18, and 20 are near Hilbert transform filters and are grouped in transform pairs. A first pair of near Hilbert transforms being the $h_i$ arm filter 14 and the $h_q$ arm filter 16. A second pair of near Hilbert transforms being the $h_q$ arm filter 18 and the $h_i$ arm filter 20. The $h_i$ designation designates an inphase filter and the $h_q$ designation designates a quadrature filter. An $h_i$ and $h_q$ filters form a Hilbert transform pair implemented as transform filter pairs. The I symbols $I_s$ are transformed into an i(t) filter response by the modulator $h_i(t)$ arm filter 14 and into an $i_H(t)$ filter response by the modulator $h_q(t)$ arm filter 16. The Q symbols $Q_S$ are transformed into a q(t) filter response by the modulator $h_i(t)$ arm filter 20 and into a $q_H(t)$ filter response by a modulator $h_q(t)$ arm filter 18. The $h_i(t)$ arm filter 14 and the $h_q(t)$ arm filter 16 are preferably a near Hilbert transform pair operating on the I symbols $I_s$. The $h_i(t)$ arm filter 20 and $h_q(t)$ arm filter 18 are preferably a near Hilbert transform pair operating on the Q symbols $Q_S$. The two $h_i$ and the two $h_q$ arm filters 14 and 18, and 16 and 20 are respectively disposed in I and Q channels as band limiting filters. The i(t) and $q_H(t)$ filter responses of respective arm filters 14 and 18 are summed by a modulator I channel summer 22 for overlapping the i(t) and $q_H(t)$ filter responses into an i(t)+$q_H(t)$ overlapped filter response of the I channel. The $i_H(t)$ and q(t) filter responses of respective arm filters 16 and 20 are subtracted by a modulator Q channel summer 24 for overlapping the $i_H(t)$ and q(t) filter responses into a q(t)−$i_H$(t) overlapped filter response of the Q channel. The I&Q channel overlapping filter response signals i(t)+$q_H(t)$ and q(t)−$i_H(t)$ in the QVSB modulator are baseband frequency signals. Accurately defined filtering by filters 14, 16, 18 and 20 may be realized using digital finite impulse response filters. As such, the arm filters 14, 16, 18 and 20 can be implemented using digital signal processing chips, tapped delay lines with coefficient multipliers, multiplier accumulators, or table lookups, all not shown but well known. The use of a lookup table is possible when the number of signal levels are deterministic and few, and the amount of samples during digital filtering is small. With digital filtering, D/A conversion and spectral replication removal, analog filtering would typically be inserted before quadrature carrier modulation.

The filter responses of filters 14, 16, 18 and 20 are combined by the summers 22 and 24 prior to modulating quadrature carriers. The summers 22 and 24 respectively generate the I channel i(t)+$q_H(t)$ overlapped filter response and the Q channel q(t)−$i_H(t)$ overlapped filter response as respective modulator I&Q channel signals for I&Q channel quadrature modulation of a carrier signal for transmission. A modulator carrier oscillator 26 provides a modulator carrier signal $\omega_C$ to a φ modulator ninety degree phase shifter 28 that in turn provides a modulator cosine carrier signal cos($\omega_C$t) to a modulator I channel mixer 30 and provides a modulator sine carrier signal sin($\omega_C$t) to an modulator Q channel mixer 32 for respectively modulating the cosine and sin I&Q channel carriers by the modulator I channel signal and the modulator Q channel signal for generating modulated I&Q channel quadrature signals. The modulated I&Q channel quadrature signals from the mixers 30 and 32 are orthogonal quadrature signals. The modulated I&Q channel quadrature signals from the mixers 30 and 32 are summed together by a modulator quadrature summer 34 for providing a modulated I&Q quadrature signal that is filtered by a modulator band pass filter (BPF) 36 providing an intermediate frequency (IF) quadrature vestigial sideband (QVSB) signal 38. The IF QVSB signal could be further upconverted into a radio frequency (RF) QVSB signal. When the $I_s$ and $Q_S$ symbol signals are passed through near Hilbert transform pairs, approximately half of the frequency spectra is canceled for spectra cancellation resulting in the vestigial sideband transmitted signal 38 that is transmitted with a gradual sideband rejection. The transmitted signal 38 is an s(t) quadrature vestigial sideband signal defined as s(t)=[i(t)+$q_H(t)$]cos($\omega_C$t)−[$i_H(t)$−q(t)]sin($\omega_C$t).

Slightly less than one half of the signal spectrum of the transmitted signal is cancelled when the transform filter pairs 14 and 16, and 18 and 20, are near Hilbert transform pairs. The signal 38 is a transmitted quadrature signal 38 that can be either an upper or lower vestigial single sideband signal. For example, the IF QVSB signal 38 may be an upper sideband signal (USB).

The QVSB demodulator receives the transmitted signal 38 as a QVSB received signal that is filtered by a demodulator, band pass filter (BPF) 40 and then translated to baseband by a demodulator I channel mixer 42 and a demodulator Q channel mixer 44 respectively using a demodulator cosine carrier signal cos($\omega_C$t) and a demodulator sine carrier signal sin($\omega_C$t). A phase synchronized demodulation carrier signal $\omega_C$ is provided by a carrier synchronizer 46. The demodulation carrier signal $\omega_C$ is phase shifted by a φ demodulator ninety degree phase shifter 48 generating the demodulator cosine and sine carrier signals respectively communicated to demodulator I&Q channel mixers 42 and 44. The received signal 38 is demodulated by the mixers 42 and 44 respectively using the cosine and sine carrier signals into the respective I&Q channel overlapping filter response signals $i(t)+q_H(t)$ and $q(t)-i_H(t)$ in the QVSB demodulator. The modulator I&Q channel overlapping filter response signals $i(t)+q_H(t)$ and $q(t)-i_H(t)$ in the QVSB demodulator are demodulated into baseband frequency signals. The demodulator I&Q channel overlapping filter response signals $i(t)+q_H(t)$ and $q(t)-i_H(t)$ are then respectively communicated to demodulator cross coupled arm filters 50 and 52, and 54 and 56. The demodulator $h_i(t)$ arm filter 50 and the demodulator $h_q(t)$ arm filter 52 are a near Hilbert transform filter pair. The demodulator $h_i(t)$ arm filter 54 and the demodulator $h_q(t)$ arm filter 56 are a near Hilbert transform filter pair. The QVSB demodulator $h_i(t)$ arm filters 50 and 56 are preferably identical to the QVSB modulator $h_i(t)$ arm filters 14 and 20, and each other. The QVSB demodulator $h_q(t)$ arm filters 16 and 18 are preferably identical to the QVSB modulator $h_q(t)$ arm filter filters 52 and 54, and each other. The preferred arm filter matching is for matched transmitter and receiver modem filtering. The demodulator $h_i(t)$ arm filter 50 provides a matched filter response $\tilde{i}(t)+\tilde{q}_H(t)$. The demodulator $h_q(t)$ arm filter 52 provides a matched filter response $-\tilde{q}(t)+\tilde{i}_H(t)$. The demodulator hi(t) arm filter 56 provides a matched filter response $-\tilde{q}(t)-\tilde{i}_H(t)$. The demodulator $h_i(t)$ arm filter 54 provides a matched filter response $\tilde{q}_H(t)+\tilde{i}(t)$. The matched filter responses $\tilde{i}(t)+\tilde{q}_H(t)$ from the arm filters 50 and 54 are summed by a demodulator I channel summer 58 to provide an I channel response signal $\tilde{\tilde{q}i}$ (t) that is equal to $2[\tilde{i}(t)+\tilde{q}_H(t)]$. The matched filter response signal $-\tilde{q}(t)-\tilde{i}_H(t)$ from the arm filter 52 is subtracted from the matched filter response signal $\tilde{q}(t)-\tilde{i}_H(t)$ from the arm filter 56 to provide a Q channel response signal $\tilde{h}q$ (t) that is equal to $2[\tilde{q}(t)-\tilde{i}_H(t)]$. The I&Q channel response signals $\tilde{\tilde{h}i}$ (t) and $\tilde{\tilde{h}}$ (t) are communicated to a quadrature crosstalk maximum likelihood sequence estimator (QCMLSE) 62 that provides a data estimate $\hat{D}_m$ 64 of the original input data $D_m$ 10. The QCMLSE also provides necessary $\hat{Q}_{k-n}$ and $\hat{I}_{k-n}$ delayed synchronization signals for controlling the carrier synchronizer 46 in a closed synchronization loop. In the preferred form, the synchronization signals $\hat{Q}_{k-n}$ and $\hat{I}_{k-n}$ represent the estimated data $\hat{D}_m$ 64 but delayed in time for proper synchronized coherent demodulation in the demodulator. The closed synchronization loop comprise the mixers 42 and 44, arm filters 50, 52, 54, and 56, summers 58 and 60, the QCMLSE 62, carrier synchronizer 46 and the phase shifter 48 for coherent demodulation of the received signal 38.

The QCMLSE 62 receives the $\tilde{\tilde{i}}$ and $\tilde{\tilde{q}}$ I&Q channel responses where the $\tilde{i}$ response has a reconstituted $\tilde{i}$ inphase component of the $I_s$ symbol set plus an undesirable $\tilde{q}_H$ quadrature crosstalk component, and where the $\tilde{\tilde{i}}$ response has a reconstituted $\tilde{q}$ quadrature component of the $Q_S$ symbol set plus an undesirable $\tilde{i}_H$ inphase crosstalk component. The QCMLSE 62 operates upon the $\tilde{\tilde{i}}$ and $\tilde{\tilde{q}}$ responses, and more particularly upon the $\tilde{i}$ inphase component and $\tilde{q}$ quadrature component to estimate the data estimate $\hat{D}_m$. By adding two positive $\tilde{i}$ or $\tilde{q}$ for the I&Q channels, the inphase and quadrature $\tilde{i}$ or $\tilde{q}$ components are enhanced by doubling as indicated by the factor of two in the $\tilde{\tilde{i}}$ (t)=$2[\tilde{i}(t)+\tilde{q}_H(t)]$ and $\tilde{\tilde{q}}$ (t)=$2[\tilde{q}(t)-\tilde{i}_H(t)]$ I&Q channel responses. The doubling of the $\tilde{i}$ and $\tilde{q}$ components provides enhanced SNR of the I&Q channel signals, but the doubling addition also serves to double the unwanted Hilbert transform crosstalk components $\tilde{q}_H$ and $\tilde{i}_H$. However, the QCMLSE 62 can accurately estimate the data estimate $\hat{D}_m$ 64 from the $\tilde{i}$ and $\tilde{q}$ components even in the presence of these unwanted Hilbert transform crosstalk components $\tilde{q}_H$ and $\tilde{i}_H$. The unwanted crosstalk components $\tilde{q}_H$ and $\tilde{i}_H$ will have a crosstalk signal structure based upon the $I_S$ and $Q_S$ symbol sequence. This crosstalk signal structure is superimposed upon the quadrature signal structure of desired $\tilde{i}$ and $\tilde{q}$ components. The use of the crosstalk signal structure and the quadrature signal structure of the channel response $\tilde{\tilde{i}}$ and $\tilde{\tilde{q}}$ provides a composite signal structure having adequate detection distances to generate the data estimate $\hat{D}_m$ from the I&Q channel responses $\tilde{\tilde{i}}$ and $\tilde{\tilde{q}}$ using a soft decision Viterbi based decoding process in the QCMLSE 62.

The QVSB modem, including the QVSB modulator of a QVSB transmitter and the QVSB demodulator of a QVSB receiver, is characterized by the cross coupled arm filters that are near Hilbert transform pairs in both the transmitting QVSB modulator and the receiving QVSB demodulator. The near Hilbert transform pairs are used for creating quadrature cross coupled vestigial sideband signaling and function to provide a sufficient demodulating detection distance for QCMLSE estimation of the data estimate $\hat{D}_m$ 64. The arm filters cross couple signal components between the I&Q channels so that the spectrum of the transmitted and receive signal 38 is more compact within a given a bandwidth for improved bandwidth efficiency but requiring the use of both I&Q channels.

The $h_i$ and $h_q$ impulse responses are even and odd time functions, respectively. The Hilbert transform arm filters $h_i$ and $h_q$ provide complimentary channel waveforms that are superimposed by the summers 22 and 24. When a symbol set, such as the inphase $I_S$ or $Q_S$, is filtered through a pair cascaded identical matched filters, such as the modulator $h_i(t)$ arm filter 14 and the demodulator $h_i(t)$ arm filter 50, the signal becomes a matched filtered signal, such as the $\tilde{i}(t)$ component response of the arm filter 50. The matched filter responses $\tilde{i}(t)$ and $\tilde{q}(t)$ are respectively provided on the I&Q channel for subsequent $\hat{D}_m$ data detection or estimation.

The desired $\tilde{i}$ and $\tilde{q}$ components can be respectively separated from the undesired crosstalk $\tilde{q}_H$ and $\tilde{i}_H$ components by the quadrature data estimator 62 because the $I_S$ and $Q_S$ symbol signals have been passed through cascaded cross coupled arm filters that are chosen to minimize the intersymbol interference (ISI).

The bandwidth efficiency of vestigial sideband (VSB) transmission is effectively doubled when independent data streams are placed on the I&Q filtering arms during QVSB signaling. The QVSB baseband filtering will result in crosstalk ISI in both channels because each I&Q channel has both a conventional even impulse response as well as near Hilbert odd impulse response component. Intersymbol interference is the superposition of time overlapping impulse responses, which last longer than a symbol interval, of adjacent symbols on one another. The arm filters are chosen so that at multiple symbol time detection points, the intersymbol interference is zero. The Hilbert components have ISI at odd symbol multiples. The minimum separation detection distance between the transmitted signals will be adversely affected by the crosstalk ISI. The arm filters are designed to minimize this crosstalk ISI. In the QVSB demodulator, contributions from both I&Q channels are summed so as to generate and increase the detection SNR by 3 dB. The cross coupling of the $I_S$ and $Q_S$ symbols inject cross coupled components serving as ISI. However, in the QVSB demodulator, the ISI crosstalk persists in the I&Q channel signals providing symbol detection ambiguity that can be substantially reduced by a Viterbi decoding algorithm. The unwanted components $\tilde{i}_H$ and $\tilde{q}_H$ are produced in a predetermined manner with a predetermined crosstalk signal structure to aid in soft decision Viterbi decoding. The type of arm filter used can increase the detection distance for improved Viterbi decoding.

Referring to FIGS. 1, 2A, 2B, 3A, 3B, 3C, and 3D, various types of filters could be used as the arm filters. The arm filters provide crosstalk signal structures and quadrature signal structure possessing adequate detection distances for Viterbi decoding. However, the demodulated I and Q transformed $\tilde{i}$ and $\tilde{q}$ channel signal will then possess ambiguously overlapping detection distances unsuitable for conventional symbol Viterbi decoding. To improve the detection distances, the arm filters 14, 16, 18, 20, 50, 52, 54, and 56, are modified to have as many zero values or equally spaced axis crossings as possible, at multiples of the symbol. time. The impulse responses and zero equal axis crossings can be realized through selecting suitable $h_i$ and $h_q$ arm filters.

Figure 2A:
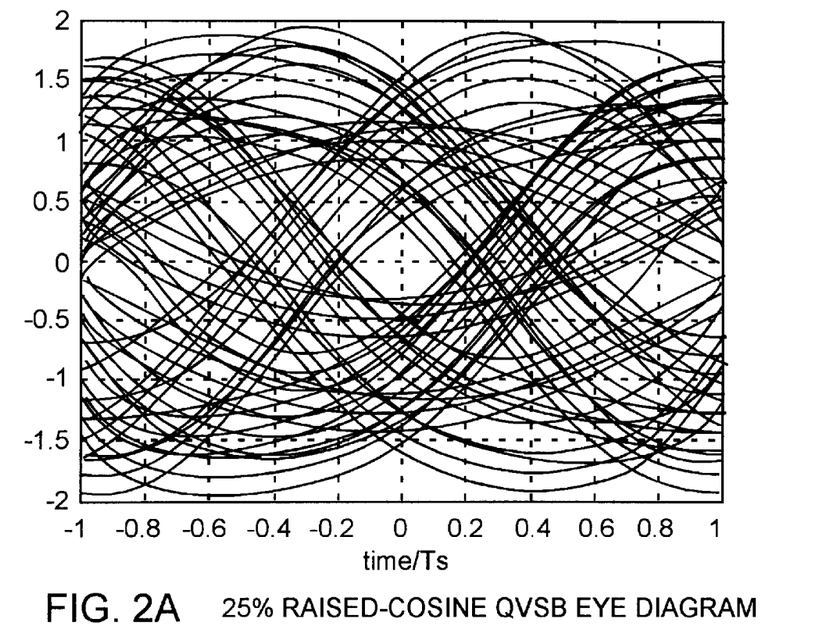
FIG. 2A is a 25% raised cosine QVSB eye diagram of the filtered output of a quadrature channel.

Raised cosine filtering does not provide equal zero axis crossing resulting in small detection distances and hence poor Viterbi decoding. When specialized Nyquist filtering is used in the QVSB modem, crosstalk ISI results at odd integer multiple symbol time intervals. The superposition of impulse responses for all possible transmitted sequences can disadvantageously result in substantial eye closure as shown for the most raised cosine responses. The bandwidth efficiency for the 25% raised cosine filter response is 1.6 symbol/s/Hz. The raised cosine filter, for example, could use smooth rolloff filtering, such as with a 100% raised cosine filter for improved detection distances. However, the bandwidth efficiency for the 100% raised cosine filter is reduced to 1.0 symbol/s/Hz.

Figure 3A:
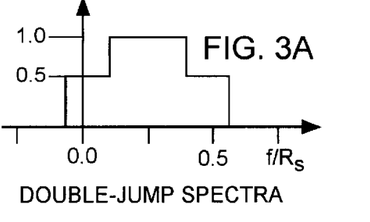
FIG. 3A is a frequency domain plot of a double jump spectra of quadrature arm filters.
Figure 3B:
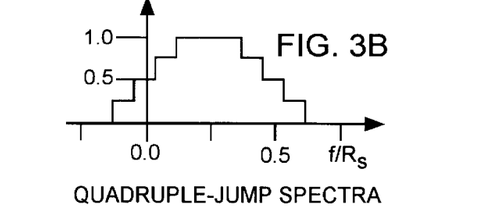
FIG. 3B is a frequency domain plot of a quadruple jump spectra of quadrature arm filters.
Figure 3C:
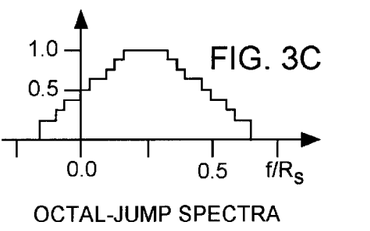
FIG. 3C is a frequency domain plot of an octal jump spectra of quadrature arm filters.

A preferable way to minimize crosstalk ISI is the use of jump spectra filtering. For example, an SSB rectangular filter, that is effectively a 0% raised cosine filter, or a single jump spectra filter, exhibits crosstalk ISI in the quadrature response at odd symbol time multiples. The crosstalk at third symbol time can be eliminated by multiplying the impulse responses by a cosine signal of frequency $R_s/6$, where $R_S$ is the symbol rate. This multiplication has the effect of shifting the frequency response up and down by $R_s/6$ thereby creating a double jump spectrum. The ISI at the fifth and seventh symbol times can likewise be eliminated by multiplying by $R_s/10$ and $R_s/14$, respectively. Hence, the number of jumps in the jump spectra can be increased by multiples of two through additional stages .of multiplication. The bandwidth efficiencies for the two, four, and eight jump spectra are 1.5 symbol/s/Hz, 1.3 symbol/s/Hz, and 1.2 symbol/s/Hz, respectively. The penalty of eliminating the crosstalk ISI is progressively less bandwidth efficiency.

Figure 2B:
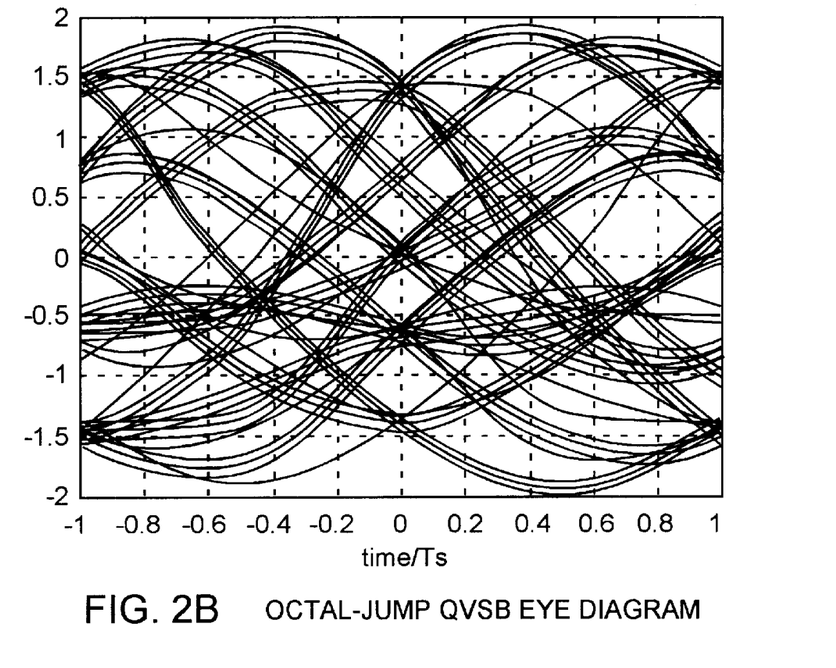
FIG. 2B is an octal jump QVSB eye diagram of the filtered output of a quadrature channel.
Figure 3D:
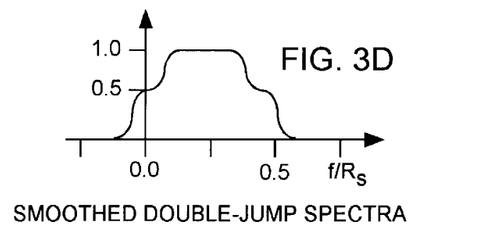
FIG. 3D is a frequency domain plot of a smoothed double jump spectra of quadrature arm filters.

The effect of the crosstalk ISI can be minimized using smoothed jump spectra arm filtering to smooth the transitions of the double jump spectra. Crosstalk ISI minimization using smoothed double jump spectra arm filtering is simpler to implement than four or eight jump spectra filtering. The filter smoothing has the effect of substantially softening the ISI at the fifth and seventh symbol times. The eye openings for the spectra of octal jump filtering are wide reflecting large detection distances for improved Viterbi decoding with increased bandwidth efficiency, compared against the 25% raised cosine spectral filtering having small detection distances for the same bandwidth efficiency. The arm filtering selected should be optimized to increase the detection distances for improved Viterbi decoding while minimizing the excess bandwidth required for improved bandwidth efficiency.

The octal jump QVSB eye diagram for octal jump filtering has nearly the same eye openings detection distances as does double jump filtering with 100% smoothing with about the same bit error rate (BER) and channel capacity bandwidth performance. For QVSB transmission, the choice of filtering can be optimized for the application. Regardless of the choice, the number of distinct amplitude levels of the I&Q channel responses $\tilde{i}$ and $\tilde{q}$ is greater than that required for quadrature double sideband transmission. The number of distinct amplitude levels that must be used is a function of the signal constellation. Any number of distinct amplitude levels may be used during QVSB transmission depending on the desired BER and channel capacity. As the channel capacity increases with improved bandwidth efficiency with raised cosine filtering, the distinct amplitude levels progressively smear together as with the 25% raised cosine spectra. As the smearing increases, the detection distance decreases resulting in poorer detection. For a given transmitted power, the more distinct amplitude signal levels for greater bandwidth efficiency, the less is the detection distance, and hence a trade off exists between bandwidth efficiency and BER. However, the crosstalk ISI that causes the additional levels in the QVSB modem is controlled under the crosstalk signal structure and the additional crosstalk amplitude levels can be to a large extent subsequently removed during data detection using Viterbi decoding in the sequence estimator 62. The unwanted $\tilde{i}_H$ and $\tilde{q}_H$ components have crosstalk signal structure defined by the arm filtering providing additional amplitude levels. The $h_i$ and $h_q$ arm filtering is chosen so that the set of all possible distinct amplitude levels are few in number so that data estimation can reliably estimate the data sequence using Viterbi decoding techniques in the estimator 62.

Figure 4:
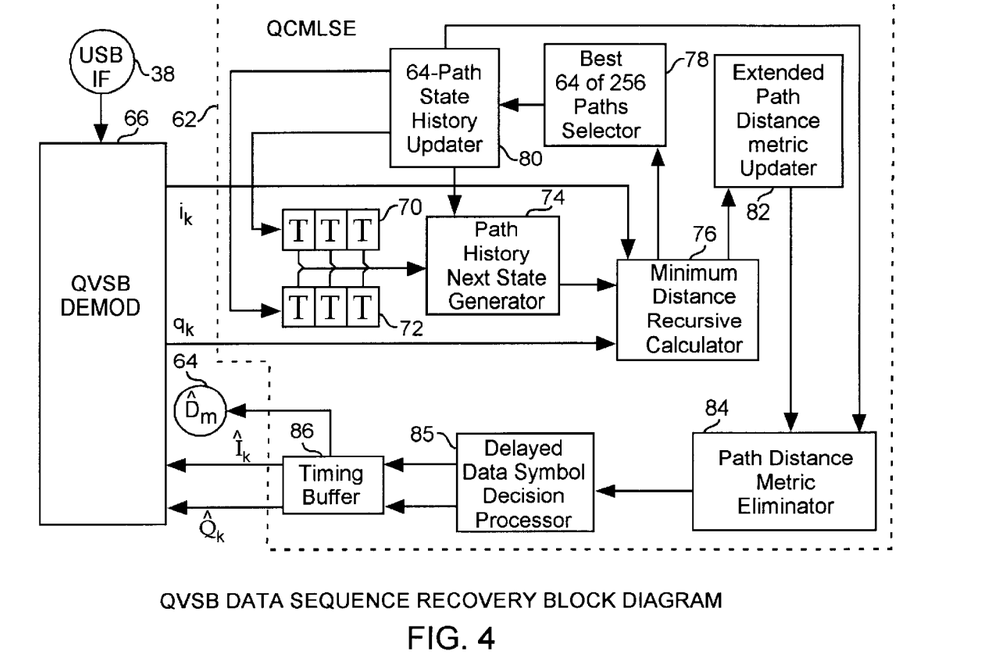
FIG. 4 is a block diagram of a generalized QVSB receiver.

Referring to FIGS. 1 through 4, and more particularly to FIG. 4, the adverse effect of the controlled intersymbol interference of the transmitted signal 38 received by a QVSB demodulator 66 is removed by the quadrature crosstalk maximum likelihood sequence estimator (QCMLSE) 62 that employs a Viterbi algorithm for generating the estimated data $\hat{D}_m$ 64. The QCMLSE 62 provides the delayed estimate $\hat{D}_m$ 64 of the most likely transmitted symbol sequence from parallel sets of noisy I&Q channel samples $i_k$ and $q_k$ of the $\tilde{i}$ and $\tilde{q}$ I&Q channel response signals from the demodulator 66. The I&Q delayed estimates $\hat{D}_m$ 64 are generated by the QCMLSE 62 while further generating $\hat{Q}_{k-n}$ and $\hat{I}_{k-n}$ quadrature synchronization signals for coherent demodulation in the QVSB demodulator 66. The $\hat{Q}_{k-n}$ and $\hat{I}_{k-n}$ quadrature synchronization signals can be used to drive a demodulator carrier synchronizer such as carrier synchronizer 46 during coherent demodulation. The QCMLSE 62 operates on paired $i_k$ and $q_k$ samples that contain the unwanted crosstalk $\tilde{i}_H(t)$ and $\hat{q}_H(t)$ ISI components from the other respective I or Q channel.

The QCMLSE 62 provides the delayed estimates $\hat{D}_m$ 64 by determining the most likely transmitted symbol sequence from the values of the parallel sets of noisy $i_k$ and $q_k$ samples. The QCMLSE 62 is a modified version of a conventional maximum likelihood sequence estimator that would otherwise process the inphase and quadrature channels independently rather than jointly based on structured soft decision Viterbi decoding techniques. The cross coupling between the channels in the QVSB modulator and QVSB demodulator requires that the channels be processed jointly rather than independently by the QCMLSE 62. The QCMLSE 62 therefore operates jointly on the $\tilde{i}$ and $\tilde{q}$ channel response signals that are part of a multilevel alphabet determined by the number of distinct amplitude values.

For 4-ary QVSB $\tilde{\underline{i}}$ and $\tilde{\underline{q}}$ channel response signals with crosstalk ISI at the first symbol time, the QCMLSE 62 is a 64-state machine with each state corresponding to the binary contents of a pair of three symbol delay registers 70 and 72 having a possible 64-states ($4^3$). Each state represents one of several possible distinct amplitude levels according to the modulation constellation being used. For 4-ary QVSB, the number of levels may be five in-phase and five quadrature amplitude levels corresponding to twenty five total amplitude pairs as shown in FIG. 2B. These twenty five amplitude combinations map to the 64-states in a trellis. Therefore, some of these 64-states correspond to ambiguous amplitude pairs. In principle, any number of states could be used as long as the computing capacity is available as the number of calculations grows geometrically with the number of delayed samples and the size of the modulation alphabet. For example, a 9-ary signaling alphabet used with these quadrature crosstalk filters would require a trellis having 93 states, that is 729 states. That is, the estimated sequence must be chosen from a pool of $M^N$ sequences where M is the sequence alphabet size, and N is the sequence length. The number of states is related to the size of the signal alphabet M and the length L of the channel according to $S=M^{L-1}$. In general, the estimated sequence $\hat{D}_m$ must be chosen from the set s of $M^N$ sequences.

The task of finding the best estimate of the I&Q sequence from the space of all possible sequences is equivalent to searching for the best path through the trellis based on the minimization of distance metrics. The Viterbi decoder algorithm provides a very efficient means for searching this trellis for the best path sequence using Euclidean distance minimization techniques that maximize the probability of receiving a particular sequence hypothesis given some observable inputs that has been obscured by additive Gaussian noise. This minimization is known as maximum likelihood sequence estimation and is based on conventional Viterbi decoding as is well known by those skilled in the art.

At each symbol time k, the state of the QVSB MLSE corresponds to one of sixty four possible hypothesis or estimates of the last three inphase and quadrature symbols. That is, with $I_k$ as the inphase symbol at time k and $Q_k$ as the quadrature symbol at time k, the value of the state $S_k$, at time k, is $[I_k, I_{k-1}, I_{k-2}, Q_k, Q_{k-1}, Q_{k-2}]$. The transition to a different $S_{k+1}$ state at time k+1, is $[I_{k+1}, I_k, I_{k-1}, Q_{k+1}, Q_k, Q_{k-1}]$, and is generated from new input data $I_{k+1}$ and $Q_{k+1}$ into the shift registers 70 and 72 and by the shifting of the data $[I_k, I_{k-1}, Q_k, Q_{k-1}]$ through shift registers 70 and 72. The transition from one state at time k to another state at time k+1 corresponds to a particular estimate or hypothesis of the symbol at time k+1, and this estimate is $[I_{k-1}, Q_{k-1}]$. The space of all possible state transitions $[S_1, S_2, \ldots, S_n, \ldots]$, known in the art as the modulation trellis, is an equivalent representation of all possible data sequences.

The function of the QMLSE 62 is to reduce the total number of possible transmitted sequences down to the most likely sequences by using maximum likelihood techniques to reduce the number of paths through the trellis to the most likely paths such as sixty four most likely paths. The decoding trellis may be represented by a 64-state machine with each state defined by the elements in the delay registers 70 and 72. The QCMLE 62 includes a local distance metrics loop for generating local metric distances. The local loop includes the input shift registers 70 and 72, a history next state generator 74, a minimum distance recursive calculator 76, a best 64-of-256 paths selector 78, and a 64-path state history updater 80. The shift registers 70 and 72 are used to generate all allowable states that transit through the trellis.

At time n, the shift registers 70 and 72 respectively receive as input all possible hypothesis estimates $I_n$ and $Q_n$ from the updater 80. Shifting the possible hypothesis estimates $I_n$ and $Q_n$ through the registers 70 and 72 to the right places the registers 70 and 72 in one of the 64-states. The shift registers 70 and 72 generate all possible hypothesis states $S_k$ transiting through four allowable state transitions through the trellis. The hypothesis states $S_k$ are passed to the path history next state generator 74. The path history next state generator 74 receives permissible trellis transitions from the 64-path state history updater 80 and the sequence of 64-states $S_k$ from the registers 70 and 72 and generates sets of local symbol estimates $[I_k, Q_k]$. The sets of local symbol estimates $[I_k, Q_k]$ from the generator 74 and I&Q channel samples $i_k$ and $q_k$ from the demodulator 66 are received by the minimum distance-recursive calculator 76 that recursively calculates minimum distance metrics for generating sets of the most likely symbols from the observed samples $q_k$ and $i_k$ and the sets of local symbol estimates $[I_k, Q_k]$ from the path history next state generator 74.

For a QVSB implementation, a local metric calculation is based on three consecutive $i_k$ and $q_k$ samples at k symbol time of the $\tilde{\underline{i}}$ and $\tilde{\underline{q}}$ channel response signals, that is, six samples, because each channel symbol is affected by crosstalk from the adjacent symbols in the other respective channel. The QMLSE 62 operates on the transmitted inphase and quadrature signals that will take on discrete amplitude values at sample times that may be approximated by a small number of discrete points. These discrete points can be visualized as the center of the amplitude clusters corresponding to the sample time in the eye diagrams. At any given k representing some multiple of the symbol time, these discrete amplitude values are a known function of the transmitted inphase and quadrature data sequences $I_S$ and $Q_S$.

The sets of most likely symbols from minimum distance recursive calculator 76 are received by the best 64-of-256 paths selector 78 that prune improbable paths through the trellis to generate the best 64-paths, that is, the most probable 64-paths through the trellis. The path pruning process that is performed by the best 64-of-256 paths selector 78 is accomplished by simply sorting the distance calculations performed by minimum distance recursive calculator 76 and choosing those paths corresponding to the minimum distances.

The best 64-paths from the selector 78 is fed to the 64-path state history updater 80 for updating the local history of the best 64-paths through the trellis. The 64-path state history updater 80 stores the trellis and allowable trellis transition information that is communicated to the path history next state generator 74 upon initialization of the QCMLSE 62. During operation, the 64-path state history updater 80 updates the trellis with new sequence estimates as the updater 80 generates all possible hypothesis estimates $I_k$ and $Q_k$.

The updated 64-path history is fed to updater 80, which generates the hypothesis estimates $I_k$ and $Q_k$. These estimates are shifted through the delay registers 70 and 72 and used by the path history next state generator 74 to generate the sets of local symbol estimates $[I_k, Q_k]$. These local estimates are subsequently communicated to the minimum distance calculator 76.

The most probable paths from the updater 80 in combination with the previous states from the delay registers 70 and 72 are fed to the generator 74 for providing a most probable indication of the next state. The most probable next state and current samples $q_k$ and $i_k$ are used by the calculator 76 for computing the minimum distance metrics. The local distance metric loop 70, 72, 74, 76, 78 and 80 recursively computes the minimum metric distance of the trellis while receiving the observed samples $q_k$ and $i_k$. In operation, the best path of the trellis stored in the updater 80 is maintained as the calculator 76 generates the minimum local distance metrics. In the local distance metric loop, a pruning decision is made by the selector 78 upon surviving trellis paths that are pruned from the total number of possible paths. This pruning decision is impacted by the constraint that only one fourth of the total number of available states can lead into the current state that in turn can only proceed to one-fourth of the total possible next available states. The trellis path with the smallest combined metric is then selected by following each path back a sufficient number of symbols through the trellis paths thereby minimizing the BER.

The recursively calculated distance metrics from the calculator 76 are fed to a global distance metric processor including the extended path distance metric updater 82, a path distance metric eliminator 84 and a delayed data symbol decision processor 85. The minimum local distance metrics from the calculator 76 are received by the extended path distance metric updater 82. The local distance metrics from the calculator 76 are added to running global distance metrics in the updater 82. The updater 82 modifies distance metrics of the most likely symbol sequence. The path distance metric eliminator 84 reduces the number of most likely sequences. Each local metric calculation by the calculator 76 is based on three consecutive $q_k$ and $i_k$ samples, that is, six samples because each channel symbol is affected by crosstalk from the adjacent symbols in the other channel. The global distance metrics are reduced by the eliminator 84 and a decision is made by the processor 85 as to the most probable, that is, an estimate of the current symbol so as to provide estimated symbol sequences $\hat{Q}_k$ and $\hat{I}_k$ at k symbol times of the input symbol sequence $I_S$ and $Q_S$. The processor 85 introduces a multiple constraint length delay to the symbol time for synchronized coherent demodulation. The estimated symbol sequences $\hat{Q}_k$ and $\hat{I}_k$ generated by the processor 85 are fed into a timing buffer 86 that combines the estimated symbol sequences $\hat{Q}_k$ and $\hat{I}_k$ into the estimated data $\hat{D}_m$ of the $D_m$ input data. The timing buffer 86 also provides the estimated sequences $\hat{Q}_k$ and $\hat{I}_k$ as synchronizing timing signals communicated to the QVSB demodulator 66 for coherent demodulation.

In the global processor 80, 82, 84, and 85, a symbol decision is made by the processor 85 for generating the estimated symbol sequences $\hat{Q}_k$ and $\hat{I}_k$. The best path selection process in the global processor 80, 82, 84 and 85 provides bursts of optimally detected symbol sequences $\hat{Q}_k$ and $\hat{I}_k$. The timing buffer 86 is necessary to regulate a feedback flow of uniform I&Q channel timing signals $\hat{Q}_k$ and $\hat{I}_k$ to the QVSB demodulator for synchronization of the coherent demodulation. Hence, The QCMLSE 62 receives the I&Q channel samples and provides data estimate $\hat{D}_m$ that are synchronously generated along with the I&Q channel signal $\hat{Q}_k$ and $\hat{I}_k$ for coherent demodulation through close loop synchronization.

Figure 5:
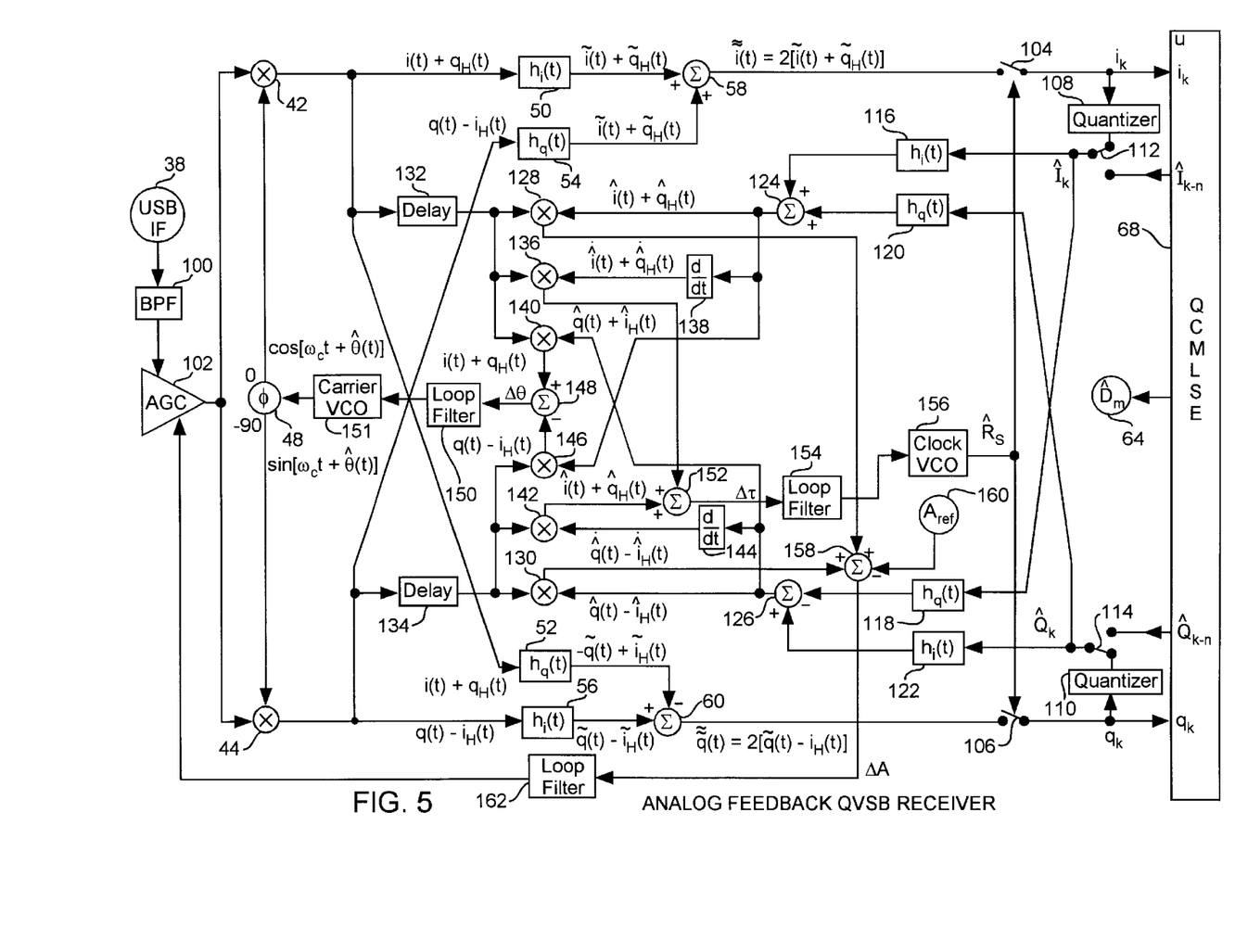
FIG. 5 is a block diagram of an analog feedback QVSB receiver.
Figure 6:
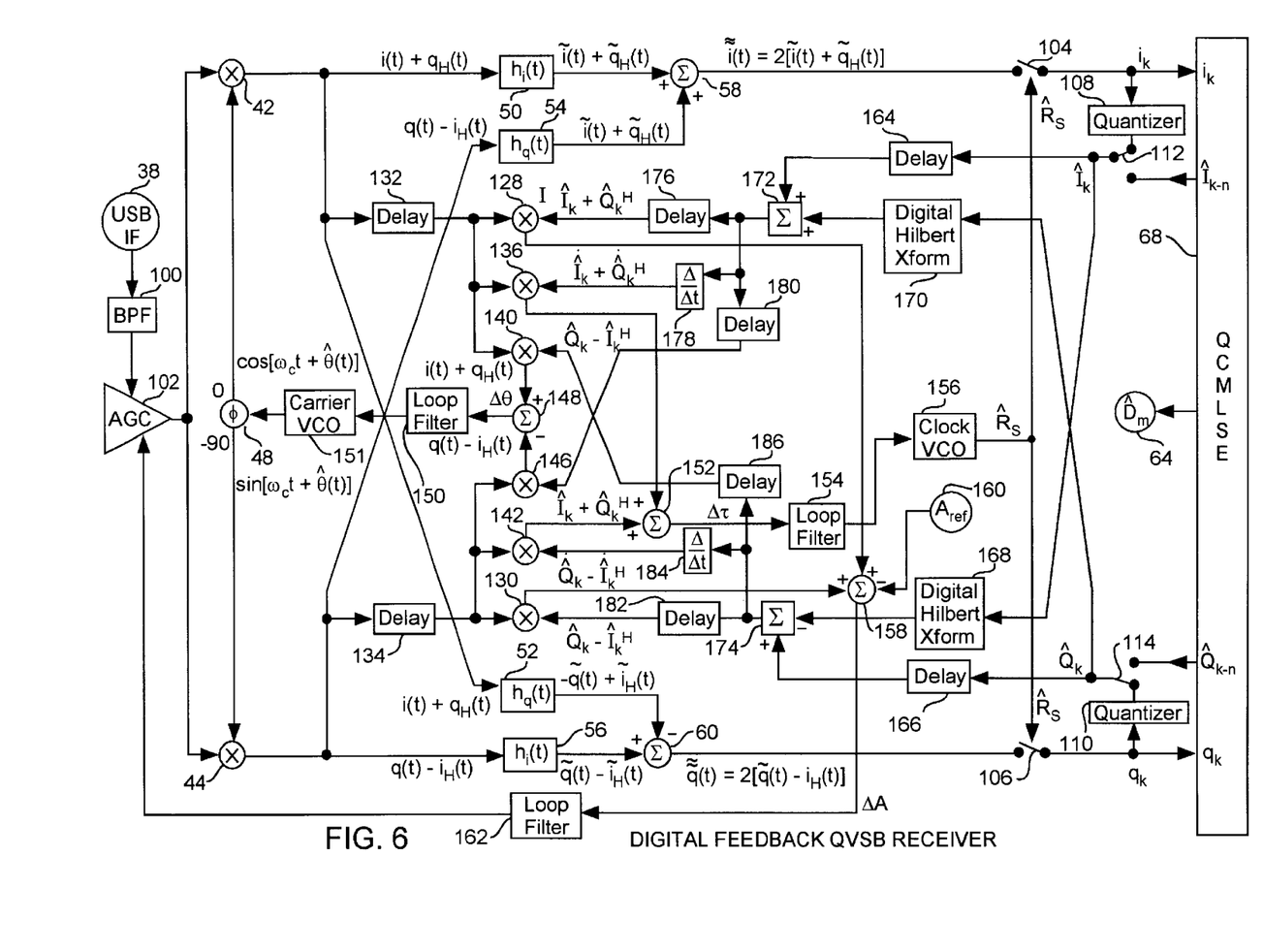
FIG. 6 is a block diagram of a digital feedback QVSB receiver.

Referring to FIGS. 1 through 6, and more particularly to FIGS. 5 and 6, an analog or a digital version of the QVSB demodulator offer enhanced operations to process the received signal 38 with coherent synchronized demodulation. Amplitude level control, phase coherent recovered carrier control and symbol timing reference control are preferred synchronized operations necessary to make reliable symbol decisions. These synchronization operations enable efficient coherent recovery of the transmitted symbol sequences where the symbol decisions by the QCMLSE 62 and the synchronized demodulator 66 are integrated together. The radio frequency or intermediate frequency QVSB received signal 38 is an input to the demodulator 66. The preferred USB IF signal 38 is passed through a bandpass filter 100 to an automatic gain control (AGC) amplifier 102 providing a filtered amplified received signal to the I&Q demodulator mixers 42 and 44. The mixers 42 and 44 downconvert the filter amplified received signal to baseband, respectively, using coherently recovered cosine $\cos(\omega_c t+\hat{\theta}t)$ and sine $\sin(\omega_c t+\hat{\theta}t)$ carriers from the phase shifter 48. The mixer 42 provides the demodulated I channel overlapping response $i(t)+q_H(t)$ signal to the $h_i$ arm filter 50, and the $h_q$ arm filter 52. The mixer 44 provides demodulation Q channel overlapping response $q(t)-i_H(t)$ signal to the $h_i$ arm filter 56 and the $h_q$ arm filter 54. The filters 50 and 54 provide the $\tilde{i}(t)+\tilde{q}_H(t)$ signals that are summed by summer 58 to providing the I channel signal $\tilde{\tilde{i}}(t)=2[\tilde{i}(t)+\tilde{q}_H(t)]$. The filter 52 provide the overlapping response $-\tilde{q}(t)+\tilde{i}_H(t)$ signal and filter 56 provides the overlapping response $\tilde{q}(t)-\tilde{i}_H(t)$ signal to the summer 60 that providing the Q channel signal $\tilde{\tilde{q}}(t)=2[\tilde{q}(t)-\tilde{i}_H(t)]$. The $\tilde{\tilde{i}}$ is sampled by a I channel sampling switch 104 as the $\tilde{\tilde{q}}$ is sampled by a q channel sampling switch 106 for respectively providing the $i_k$ and $q_k$ sampled input signals to the QCMLSE 62. In some implementation with sufficiently low BER, quantizers 108 and 110 can respectively quantize the $i_k$ and $q_k$ sampled signals for providing synchronized estimates $\hat{I}_k$ and $\hat{Q}_k$ for coherent demodulation using an estimated symbol rate clocking signal $\hat{R}_S$. Alternatively, the QCMLSE 62 can generate the quadrature synchronization $\hat{Q}_{k-n}$ and $\hat{I}_{k-n}$ signals to timing switches 112 and 114 for respectively providing the synchronized estimates $\hat{I}_k$ and $\hat{Q}_k$.

In the analog demodulator, the estimate $\hat{I}_k$ is coupled to a recovery I channel $h_i$ filter 116 and cross coupled to a recovery Q channel $h_q$ filter 118, and, the estimate $\hat{Q}_k$ is cross coupled to a recovery I channel transform $h_q$ filter 120 and is coupled to a recovery Q channel hi filter 122. Responses of filters 116 and 120 are summed by summer 124 providing an estimated I channel overlapping filter response $\hat{i}(t)+\hat{q}_H(t)$. Responses of filters 118 and 122 are subtracted by summer 126 providing an estimated Q channel overlapping filter response $\hat{q}(t)-\hat{i}_H(t)$.

In both the analog version and the digital version, the demodulator I&Q channel overlapping filter response signals $i(t)+q_H(t)$ and $q(t)-i_H(t)$ respective from demodulator mixers 42 and 44 are communicated to respective I&Q channel amplitude recovery mixers 128 and 130 through respective I&Q channel delays 132 and 134 providing delayed $i(t)+q_H(t)$ and $q(t)-i_H(t)$. These two delayed $i(t)+q_H(t)$ and $q(t)-i_H(t)$ signals are also respectively communicated to I&Q channel symbol rate recover mixers 136 and 142 and to I&Q channel symbol phase recovery mixers 140 and 146. The mixers 128, 130, 136, 142, 140 and 146 are four quadrant multipliers for generating $\Delta\tau$ rate, $\Delta\theta$ phase and $\Delta A$ amplitude error signals for improved coherent demodulation.

In the analog version, the estimated filter responses $\hat{i}(t)+\hat{q}_H(t)$ and $\hat{q}(t)-\hat{i}_H(t)$ respectively from summers 124 and 126 are communicated mixers 128, 146 and differentiator 138, and to mixers 130, 140 and differentiator 144. The differentiators 138 and 144 in turn respectively provide respective estimated differentiated I&Q channel signals $\dot{\hat{i}}(t)+\dot{\hat{q}}_H(t)$ and $\dot{\hat{q}}(t)-\dot{\hat{i}}_H(t)$ that are respectively communicated to the rate recovery mixers 136 and 142. The output of the phase recovery mixers 140 and 146 are subtracted by a phase recovery summer 148 providing the Δθ phase error signal to a phase recovery loop filter 150 that drives the recovery carrier VCO 151 that in turn drives the phase shifter 48. The outputs of the rate recovery mixers 136 and 142 are summed by a rate recovery summer 152 provide the rate error signal Δτ to a rate loop filter 154 that drives a rate clock VCO 156 providing the estimated symbol rate signal $\hat{R}_S$. An amplitude reference source 160 provides the amplitude reference $A_{ref}$ signal that is subtracted from the sum of the outputs of the recovery amplitude mixers 128 and 130 by an amplitude recovery summer 158 providing the amplitude error signal ΔA. The amplitude error signal is fed through an amplitude loop filter 162 that provides a DC signal for adjusting the gain of the AGC amplifier 102. The digital version of the improved demodulator has a similar structure to the analog version, including the mixers 128, 130, 140, 142, 146, 148, delays 132 and 134, summers 148, 152, and 158, loop filters 150, 154, and 162, reference source 160, VCOs 151 and 156. However, in the digital version, I&Q recovery delays 164 and 166 respectively replace the filters 116 and 122 of the analog version, and, digital Hilbert transform filters 168 and 170 respectively replace the filters 122 and 120 of the analog version, and, digital summers 172 and 174 respectively replace summer 124 and 126 of the analog version, and, digital differentiators 178 and 184 respectively replace differentiator 138 and 144 in the analog version, with the addition of I&Q digital delays 176 and 180, and 182 and 186. The I&Q channel digital delays 176 and 180, and 182 and 186 respectively delay I&Q estimated signals $\hat{I}_k + \hat{Q}_k^H$ and $\hat{Q}_k - \hat{I}_k^H$ respectively to mixers 128 and 146, and 130 and 140 for proper synchronized timing during coherent recovery demodulation. The digital differentiators 178 and 184 respectively provide estimated differentiated signals $\hat{I}_k + \hat{Q}_k^H$ and $\hat{Q}_k - \hat{I}_k^H$ to the rate recovery mixers 136 and 142. The analog and digital demodulator similarly operate to provide three concurrent recovery closed loops using phase rate and amplitude summers 148, 152, and 158 providing the Δθ phase, Δτ rate, and ΔA amplitude error signals for enabling coherent demodulation.

In close loop operation, the estimate signals, $\hat{Q}_k$, $\hat{I}_k$, $\hat{i}(t)+\hat{q}_H(t)$, $\hat{q}(t)-\hat{i}_H(t)$, $\hat{i}(t)+\hat{q}_H(t)$, $\hat{q}(t)-\hat{i}_H(t)$, $\hat{I}_k+\hat{Q}_k^H$, $\hat{Q}_k-\hat{I}_k^H$, $\hat{I}_k+\hat{Q}_k^H$, and $\hat{Q}_k-\hat{I}_k^H$, are integrally synchronized, to maintain the symbol rate $\hat{R}_S$ of the rate VCO 156, the amplitude of the filter amplitude received signal of the amplifier 102, and the carrier reference of the carrier VCO 151. The delay of delays 132 and 134 matches the time required to generate correlated data feedback of the estimate signals $\hat{i}(t)+\hat{q}_H(t)$, $\hat{q}(t)-\hat{i}_H(t)$, $\hat{i}(t)+\hat{q}_H(t)$, $\hat{q}(t)-\hat{i}_H(t)$, $\hat{I}_k+\hat{Q}_k^H$, $\hat{Q}_k-\hat{I}_k^H$, $\hat{I}_k+\hat{Q}_k^H$, and $\hat{Q}_k-\hat{I}_k^H$. In this manner, like received symbols are multiplied together. The QCMLSE 62 operates to detect the estimated symbols $\hat{Q}_k$ and $\hat{I}_k$, and, hence the demodulator need to have delays for a sufficient number of data symbol times using internal delays to have negligible impact on the bit error ratio. As a result, the bandwidth of the three tracking loops through summers 148, 152 and 158 has to be relatively narrow compared to the symbol rate $\hat{R}_S$, for demodulation stability. For applications where a narrow tracking bandwidth is not appropriate, as well as for most acquisition situations, the QCMLSE 62 can be bypassed through the quantizers 108 and 110 where the sample values are effectively detected symbol by symbol with an incumbent sacrifice in SNR. Hence, the QCMLSE 62 or the quantizers 108 and 110 feed post detected estimated data symbol samples $\hat{Q}_k$ and $\hat{I}_k$ to drive the three phase, rate and amplitude synchronized tracking loops.

The demodulators provide enhanced amplitude tracking, carrier tracking, and symbol rate tracking under feedback control operation of the demodulator to a steady state condition. The purpose of the filters 116, 118, 120 and 122, as well as the digital replacements of the digital version, is to recreate effectively noiseless correlation waveforms to remove the data modulation from the received signal 38. In this manner, the phase, rate, and amplitude tracking loops can operate on the fundamental components of received signal amplitude, carrier phase, and symbol timing.

In the analog version, for amplitude synchronized feedback using the automatic gain control synchronization loop, the tracking loop error signal ΔA varies the amplitude of the input signal 38 from the filter 100 to maintain a constant value. The delayed mixer outputs of delays 132 and 134 are multiplied using mixer 128 and 130 by fed back estimated replica waveforms effectively yielding a signal squared operation. Both of the I&Q channel overlapping filter signals $i(t)+q_H(t)$ $q(t)-i_H(t)$ are combined by recovery amplitude summer 158 to improve the tracking loop SNR by 3.0 dB. The result is lowpass filtered to yield a DC component proportional of the received signal to the difference between the received signal level and a reference value ΔA. When the difference is zero, the nominal automatic gain control level is attained.

For phase recovery, the estimated outputs of summers 124 and 126 are multiplied using mixers 140 and 136 and added by summer 148 to provide the phase error signal Δθ. These multiplied components are combined and filtered at baseband for driving the phase loop filter 150 at baseband. The carrier phase recovery feedback is fed into the multipliers 140 and 146 as cross coupled from the opposite I&Q channels, and the multiplier outputs are differenced by summer 148 to form a phase detector providing the phase Δθ. In this manner, most of the data pattern noise is subtracted out, and a component proportional to the sine of the phase difference is passed through the loop filter 150. After the data modulation removal, lockup proceeds as in a conventional phase lock loop, such that when the sine of the phase error is zero, carrier phase tracking has reached steady state, when the drive signal to the carrier voltage controlled oscillator 151 remains unchanged.

For symbol rate recovery, the data feedback is different than the other two amplitude and phase tracking loops. The delayed mixer outputs of delays 132 and 134 are multiplied in rate recovery mixers 136 and 142 by the time derivatives of differentiators 138 and 144 of the estimated $\hat{i}+\hat{q}_H$ and $\hat{q}-\hat{i}_H$ feedback providing the estimated derivative signals $\hat{i}+\hat{q}_H$ and $\hat{q}-\hat{i}_H$. The derivative is typically a maximum when the nonderivative multiplier input goes through a zero crossing. Hence, leading or lagging zero crossings are converted to either positive or negative going DC offsets that drive the rate loop to center the symbol timing rate. When the zero crossings are centered, the net DC offset is zero, and the symbol timing rate has reached a steady state value.

Figure 7A:
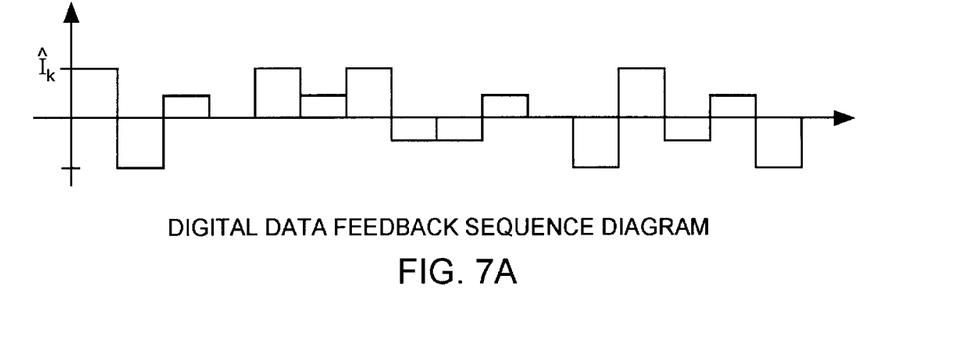
FIG. 7A is a digital data feedback sequence diagram.
Figure 7B:
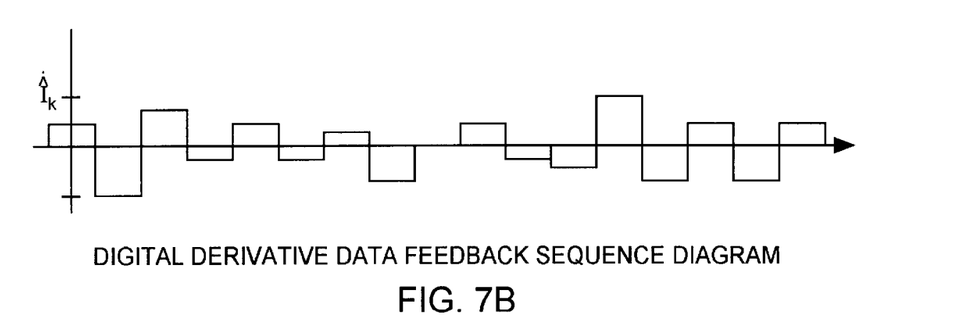
FIG. 7B is a digital derivative data feedback sequence diagram.
Figure 7C:
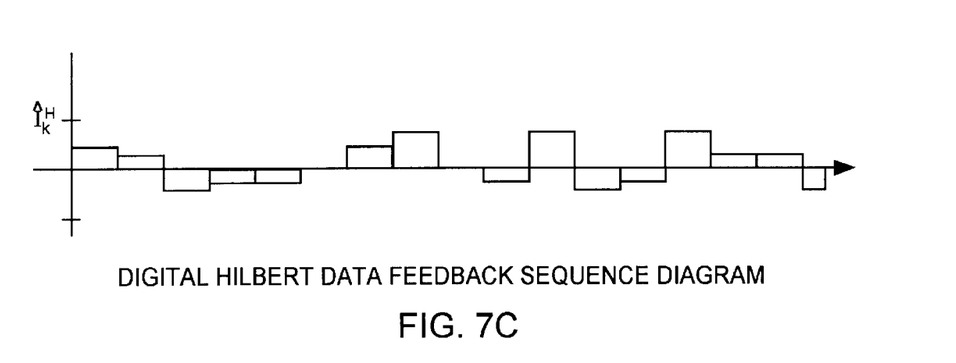
FIG. 7C is a digital Hilbert data feedback sequence diagram.

Referring to FIGS. 1 through 7, and more particularly to FIGS. 6 and 7, the digital version of the demodulator can be realized using digital equivalent components. The digital embodiment includes QVSB synchronization with digital data feedback that enables a digital signal processing embodiment of the QVSB modem. In many applications, all of the hardware except the mixers and phase shifters can be implemented with digital signal processing technology. On the transmit side, D/A converters, not shown, would typically be placed between the summed QVSB data filters and the mixers. On the receive side, A/D converters, not shown, would reside in the complementary position between the mixers and the cross coupled $h_i$ and $h_q$ filters 50, 52, 54, and 56. Also, D/A converters, not shown, would be needed before the VCO 151, or afterwards when a numerically controlled oscillator (NCO) is used instead.

Referring generally to all of the figures, there are several ways in which QVSB data demodulation and decoding may be realized in hardware including the data feedback structure. For example, the QCMLSE 62 may not be used for synchronization, but rather the quantizers 108 and 110 are used to generate feedback estimates $\hat{Q}_k$ and $\hat{I}_k$. This quantization estimation approach simplifies the hardware and removes some of the additional delay from the tracking loops. The digital feedback variations can be created from the QCMLSE data feedback whose $\hat{Q}_{k-n}$ and $\hat{I}_{k-n}$ signals are discrete amplitude estimates of the transmitted amplitude levels. In the absence of filtering, the $\hat{Q}_{k-n}$ and $\hat{I}_{k-n}$ estimates are not smooth, but digitized boxcar waveshapes of fixed amplitude over the duration of the sample rate could be used. The $\Delta/\Delta t$ time derivatives of differentiators 178 and 184 are also discrete amplitude estimates proportional to the level differences in the non-derivative $\hat{I}_k$ and $\hat{Q}_k$. The $\hat{Q}_k$ and $\hat{I}_k$ time derivative of the $\hat{Q}_k$ and $\hat{I}_k$ estimates must also be advanced by half a symbol time relative to the nonderivatives, to establish the proper timing relationship between the incoming signals and the fed back time derivatives, and hence the use of delays 176, 180, 182 and 186, as shown in FIG. 7.

The digital version preferably uses the digitized Hilbert transforms 170 and 168. The Hilbert transforms 168 and 170 are appropriate for SSB and VSB use because the $h_q$ quadrature filter is approximately the Hilbert transform of the $h_i$ inphase filter. The Hilbert transforms may be realized as a table lookup because the dominant IR samples from the $h_q$ quadrature filter can be limited to the ±1 symbol positions. Thus, a pulse of inphase feedback generates two quadrature feedback pulses of alternating polarity, at the adjacent symbol positions, with approximately half the inphase pulse amplitude. Hence, delays 164 and 166 are used to time align the $\hat{Q}_k$ and $\hat{I}_k$ estimates with the transform filter signal from the digital Hilbert transforms 170 and 166. Because the Hilbert transform output must be delayed at least one symbol time, the other waveform inputs to the synchronization loop multipliers must be delayed accordingly using the added delays 176, 178, 180 and 186.

To reduce the number of data filters in the modulator and demodulator in an equivalent manner, the even time filter responses of the hi filters could be pushed back through the cross coupling nodes where the $h_i$ and $h_q$ paths split to the I&Q channels. Then, after the split, the $h_i$ path would be a wire and the $h_q$ path would have a 90° broadband phase shifter. Yet another equivalent realization would be to move the baseband data filters 36 and 40 to IF/RF, on either or both the transmit and receive sides, and to use simple lowpass roofing filters at baseband.

The preferred embodiments may be subject to bursts of symbol errors due to the QCMLSE processing. The QVSB modem implementation can be enhanced with concatenated or turbo coding with interleaving for improved performance. Similarly, a useful extension might also include trellis-coded modulation. The preferred embodiments use transmit and receive baseband filtering with overlaid quadrature signals to modulate and demodulate QVSB signals. The use of jump spectra minimizes crosstalk and ISI during QVSB transmission. Also, due to sensitivity to the channel transmission amplitude and phase dispersion, active or passive equalization circuitry may be employed.

The system is general and could be used in various applications where bandwidth efficient digital data transmission is important. QVSB signaling can be readily implemented with currently available components at data rates below 100 Mbits/s. The 4-ary QVSB can be readily extended to 8-ary and 16-ary signaling having bandwidth efficiencies that are equivalent to 64-ary and 256-ary conventional modulation techniques, respectively. A 4-ary QVSB achieves the same bandwidth efficiency of conventional 16-ary QDSB data transmission, but it requires less SNR. In a linear channel, QVSB is substantially more efficient in bandwidth and SNR than conventional data transmission techniques. Those skilled in the art can make enhancements, improvements, and modifications to the invention, and these enhancements, improvements, and modifications may nonetheless fall within the spirit and scope of the following claims.

What is claimed is:

1. A method of modulating a carrier for transmitting a quadrature vestigial single sideband (QVSB) signal for communicating I symbols and Q symbols, the method comprising the steps of, cross arm filtering the I and Q symbols for generating i filter responses and $i_H$ filter responses from the I symbols and for generating $q_H$ filter responses and q filter responses from the Q symbols, combining the i and $q_H$ filter responses into an I channel overlapping filter signal and the q and $i_H$ filter responses into a Q channel overlapping filter signal, and quadrature modulating a carrier by the I and Q channel overlapping filter responses into a modulated inphase signal and a modulated quadrature signal, the Q channel overlapping filter response modulates the carrier shifted ninety degrees from the carrier modulating the I channel overlapping filter responses for modulating the carrier in quadrature, summing the modulated inphase signal and a modulated quadrature signal into the QVSB signal, and transmitting the QVSB signal for communicating the I and Q symbols over a single sideband.

2. The method of claim 1 wherein cross arm filter step, the i and $i_H$ filter responses are near Hilbert transform pair filtered responses, and the q and $q_H$ filter responses are near Hilbert transform paired filtered responses.

3. The method of claim 1 wherein, the i and $i_H$ filter responses are near Hilbert transform pair filtered responses, the q and $q_H$ filter responses are near Hilbert transform paired filtered responses, the i and $i_H$ filter responses are selected from the group consisting of raised cosine, jump, and smoothed jump filtered responses, and the q and $q_H$ filter responses are selected from the group consisting of raised cosine, jump, and smoothed jump filtered responses.

4. The method of claim 1 wherein, the I and Q symbols have a symbol time, and the QVSB signal transmitted in quadrature has cross coupled intersymbol interference extending from the symbol time of one of the I and Q symbols into an adjacent symbol times of an adjacent one of the Q and I symbols, respectively.

5. The method of claim 1 further comprising the step of, the mapping data into the I and Q symbols for providing the I and Q symbols as independent data sets having a constellation of detection levels.

6. The method of claim 1 wherein the cross arm filtering step and the combining step comprises the steps of,
- Hilbert transform filtering the I symbols into the i filter response,
- inverse Hilbert transform filtering the Q symbol into the $q_H$ filter response,
- inverse Hilbert transform filtering the I symbols into the $i_H$ filter response,
- Hilbert transform filtering the Q symbols into the q filter response,
- cross coupled summing the i and $q_H$ filter responses into the I channel overlapping filter responses as $i+q_H$ I channel overlapping filter responses, and
- cross coupled subtracting the $i_H$ and q filter responses into the Q channel overlapping filter responses as $q-i_H$ Q channel overlapping filter responses.

7. A method of demodulating a transmitted quadrature vestigial sideband (QVSB) signal modulating a carrier in quadrature by I and Q overlapping filter responses respectively from I and Q symbols, the method comprising the steps of,
- receiving the transmitted QVSB signal as a received QVSB signal,
- splitting the received QVSB signal into an I channel QVSB signal and a Q channel QVSB signal,
- coherent demodulating the I channel QVSB signal by a replicated carrier and the Q channel QVSB signal by a ninety degree phase shifted replicated carrier for respectively generating the I and Q overlapping filter responses,
- cross arm filtering the I and Q overlapping filter responses for generating $\tilde{i}+\tilde{q}_H$ and $-\tilde{q}+\tilde{i}_H$ match filter responses from the I overlapping filter responses and for generating $\tilde{i}+\tilde{q}_H$ and $\tilde{q}-\tilde{i}_H$ matched filter responses from the Q overlapping filter responses, and
- combining both of the $\tilde{i}+\tilde{q}_H$ matched filter responses into an I channel response signal and the $-\tilde{q}+\tilde{i}_H$ and $\tilde{q}-\tilde{i}_H$ matched filter responses into a Q channel response signal.

8. The method of claim 7 wherein,
the $\tilde{i}+\tilde{q}_H$ and $-\tilde{q}+\tilde{i}_H$ match filter responses are near Hilbert transform pair filtered responses, and
the $\tilde{i}+\tilde{q}_H$ and $\tilde{q}-\tilde{i}_H$ matched filter responses are near Hilbert transform pair filtered responses.

9. The method of claim 7 wherein,
the $\tilde{i}+\tilde{q}_H$ and $-\tilde{q}+\tilde{i}_H$ match filter responses are near Hilbert transform pair filtered responses,
the $\tilde{i}+\tilde{q}_H$ and $\tilde{q}-\tilde{i}_H$ matched filter responses are near Hilbert transform pair filtered responses,
the $\tilde{i}+\tilde{q}_H$ and $-\tilde{q}+\tilde{i}_H$ match filter responses are filter responses are selected from the group consisting of raised cosine, jump, and smoothed jump filtered responses, and
$\tilde{i}+\tilde{q}_H$ and $\tilde{q}-\tilde{i}_H$ match filter responses are filter responses are selected from the group consisting of raised cosine, jump, and smoothed jump filtered responses.

10. The method of claim 7 wherein the I channel overlapping response signal is an $i+q_H$ overlapping response signal and the Q channel overlapping response signal is a $q+i_H$ overlapping response signal,
the cross arm filtering step and combining step comprises the steps of,
- Hilbert transform filtering the $i+q_H$ overlapping response signal into an $\tilde{i}+\tilde{q}_H$ match filter response,
- inverse Hilbert transform filtering the $q-i_H$ overlapping response signal into an $\tilde{i}+\tilde{q}_H$ matched filter response,
- inverse Hilbert transform filtering the $i+q_H$ overlapping response signal into an $-\tilde{q}+\tilde{i}_H$ match filter response,
- Hilbert transform filtering the $q-i_H$ overlapping response signal into a $\tilde{q}-\tilde{i}_H$ match filter response,
- cross coupled summing the $\tilde{i}+\tilde{q}_H$ matched filter responses into the I channel response signal as an $\tilde{\tilde{i}\tilde{i}}$ =$2[\tilde{i}+\tilde{q}_H]$ I channel response signal, and
- cross coupled subtracting the $-\tilde{q}+\tilde{i}_H$ and $\tilde{q}-\tilde{i}_H$ matched filter responses into the Q channel response signal as a $\tilde{\tilde{q}}$ =$2[\tilde{q}-\tilde{i}_H]$ Q channel response signal.

11. The method of claim 7 further comprising the steps of,
detecting the I and Q channel responses for generating a synchronized timing signal for carrier tracking the replicated carrier and the ninety degree phase shifted carrier for coherent demodulation of the I and Q channel overlapping response signals.

12. The method of claim 7 further comprising the step of,
detecting from the I and Q symbols from the I and Q channel response signals and mapping the I and Q symbols into data.

13. A method of communicating I and Q symbols, the method comprising the steps of,
- cross arm filtering the I and Q symbols for generating i filter responses and $i_H$ filter responses from the I symbols and for generating $q_H$ filter responses and q filter responses from the Q symbols,
- combining the i and $i_H$ filter responses into an I channel overlapping filter signal and the q and $q_H$ filter responses into a Q channel overlapping filter signal, and
- quadrature modulating a carrier by the I and Q channel overlapping filter responses into a modulated inphase signal and a modulated quadrature signal, the Q channel overlapping filter response modulates the carrier shifted ninety degrees from the carrier modulating the I channel overlapping filter responses for modulating the carrier in quadrature,
- combining the modulated inphase signal and a modulated quadrature signal into a quadrature vestigial single sideband (QVSB),
- transmitting the QVSB signal for communicating the I and Q symbols over a single sideband,
- receiving the transmitted QVSB signal as a received QVSB signal,
- splitting the received QVSB signal into an I channel QVSB signal and a Q channel QVSB signal,
- coherent demodulating the I channel QVSB signal by a replicated carrier and the Q channel QVSB signal by a ninety degree phase shifted replicated carrier for respectively generating the I and Q overlapping filter responses,
- cross arm filtering the I and Q overlapping filter responses for generating $\tilde{i}+\tilde{q}_H$ and $-\tilde{q}+\tilde{i}_H$ match filter responses from the I overlapping filter responses and for generating $\tilde{i}+\tilde{q}_H$ and $\tilde{q}-\tilde{i}_H$ matched filter responses from the Q overlapping filter responses, and
- combining the $\tilde{i}+\tilde{q}_H$ matched filter responses into an I channel response signal and $-\tilde{q}+\tilde{i}_H$ and $\tilde{q}-\tilde{i}_H$ matched filter responses into a Q channel response signal.

14. The method of claim 13 wherein,
the i and $i_H$ filter responses are near Hilbert transform pair filtered responses, the q and $q_H$ filter responses are near Hilbert transform paired filtered responses, the i and $i_H$ filter responses are selected from the group consisting of raised cosine, jump, and smoothed jump filtered responses, and the q and $q_H$ filter responses are selected from the group consisting of raised cosine, jump, and smoothed jump filtered responses, the $\tilde{i}+\tilde{q}_H$ and $-\tilde{q}+\tilde{i}_H$ match filter responses are near Hilbert transform pair filtered responses, the $\tilde{i}+\tilde{q}_H$ and $\tilde{q}-\tilde{i}_H$ matched filter responses, are near Hilbert transform pair filtered responses, the $\tilde{i}+\tilde{q}_H$ and $-\tilde{q}+\tilde{i}_H$ match filter responses are filter responses are selected from the group consisting of raised cosine, jump, and smoothed jump filtered responses, and the $\tilde{i}+\tilde{q}_H$ and $\tilde{q}-\tilde{i}_H$ match filter responses are filter responses are selected from the group consisting of raised cosine, jump, and smoothed jump filtered responses.

15. The method of claim 13 wherein, the i and $i_H$ filter responses are near Hilbert transform pair filtered responses, the q and $q_H$ filter responses are near Hilbert transform paired filtered responses, the $\tilde{i}+\tilde{q}_H$ and $-\tilde{q}+\tilde{i}_H$ match filter responses are near Hilbert transform pair filtered responses, the $\tilde{i}+\tilde{q}_H$ and $\tilde{q}-\tilde{i}_H$ matched filter responses are near Hilbert transform pair filtered responses, and all of the near Hilbert transform pair filter responses are generated from identical cross arm filtering selected from the group consisting of raised cosine, jump, and smoothed jump filtering.

16. The method of claim 13 further comprising the steps of, the mapping data into the I and Q symbols for providing the I and Q symbols as independent data sets having a constellation of detection levels, sampling the I and Q channel responses into I and Q discrete sample values at discrete times within a set of constellation amplitude values, and estimating the data from the I and Q discrete sample values using the I and Q discrete sample values.

17. The method of claim 13 further comprising the steps of, the mapping original data into the I and Q symbols for providing the I and Q symbols as independent data set having a constellation of detection levels prior to modulation, and quantizing the I and Q channel response signals for estimating the original data.

18. The method of claim 13 further comprising the step of, carrier varying the replicated carrier and ninety degree phase shifted replicated carrier for synchronization to the symbol times for coherent demodulation of the received QVSB signal.

19. The method of claim 13 further comprising the step of, amplitude varying the amplitude of the received signal for constant amplitude demodulation of the received QVSB signal.

20. The method of claim 13 further comprising the step of, phase varying for phase synchronizing the replicated carrier and the ninety degree phase shifted carrier for coherently demodulating the received QVSB signal.

* * * * *